United States Patent [19]
Masson et al.

[11] Patent Number: 4,975,909
[45] Date of Patent: Dec. 4, 1990

[54] BROADCAST NETWORK

[75] Inventors: Gerald M. Masson, Baltimore, Md.; John L. Driscoll, Jeannette, Pa.

[73] Assignee: Compunetics, Inc., Monroeville, Pa.

[21] Appl. No.: 258,217

[22] Filed: Oct. 14, 1988

[51] Int. Cl.$^5$ .............................. H04J 3/24; H04J 3/02
[52] U.S. Cl. ................................ 370/94.3; 370/85.14; 370/85.12
[58] Field of Search .................... 370/94.3, 94.1, 85.15, 370/85.12, 85.9, 85.14

[56] References Cited

U.S. PATENT DOCUMENTS

| | | | |
|---|---|---|---|
| 4,672,373 | 6/1987 | Mori et al. | 370/86 |
| 4,719,625 | 1/1988 | Bell et al. | 370/86 |
| 4,736,465 | 4/1988 | Bobey et al. | 370/88 |
| 4,742,511 | 5/1988 | Johnson | 370/88 |
| 4,759,015 | 7/1988 | Takai et al. | 370/85.15 |
| 4,797,882 | 1/1989 | Maxemchuk | 370/94 |

Primary Examiner—Douglas W. Olms
Assistant Examiner—Wellington Chin
Attorney, Agent, or Firm—Reed Smith Shaw & McClay

[57] ABSTRACT

The present invention pertains to a broadcast network. The broadcast network comprises N transmit stations, with each transmit station being capable of transmitting a signal and N being an integer $\geq 1$. There are also M receive stations, where M is an integer $\geq 2$; I switching stages where I is an integer $\geq 0$ and a broadcast hub. The broadcast hub and I switching stages are connected such that they are capable of linking the N transmit stations to the M receive stations so that any one of the N transmit stations can transmit a signal to L of the receive stations, where L is an integer and $2 \leq L \leq M$, but each receive stations can receive a signal from only one of the N transmit stations at any given time. The broadcast hub and switching stages link more than one of the N transmit stations to desired receive stations at any given time.

39 Claims, 23 Drawing Sheets

BROADCAST NETWORK

FIELD OF THE INVENTION

The present invention is related to space-division broadcast switching networks which provide a one-to-many interconnection capability from their inputs to their outputs. More specifically, the present invention relates to broadcast modules that are capable of being linked together in hub structures. These structures can be used with switching components which unto themselves only provide a one-to-one connecting capability to form a new class of space-division broadcast switching networks.

BACKGROUND OF THE INVENTION

A space-division switching network is a communication system in which connections from a set of input ports to a set of output ports are established by physically linking paths together by means of switching elements. The term in space-division is used because communication paths are implemented by linking together a dedicated connection in space as opposed to sharing a connection in time.

In most space-division switching networks, the input ports and output ports are linked together in what can generically be referred to as a one-to-one transmit/-receive arrangement. These one-to-one transmit/-receive arrangements are often referred to as permutation connections. Each input port is directly and permanently attached, by means of an appropriate interfacing mechanism, to a transmit port of a transmit station. The transmit station serves as a source of, for example, voice/data information which is fed into the switching network through the input port to which it is interfaced. Each output port is directly and permanently attached, by means of an appropriate interfacing mechanism, to a receive port of a receive station. The receive station serves as a sink or destination of the voice/data information being transmitted through the switching network over the connecting path that has been implemented. In a permutation connection, the communication requirement between the transmit stations and the receive stations is such that, at any time, each input port must be connected to at most one output port. Networks providing such one-to-one connectivity are usually referred to as *permutation switching networks*.

There exists a class of communication requirements between the transmit stations and the receive stations where the connectivity required of the switching network is much more demanding than one-to-one port pairing in that an input port interfaced to a transmit station must be connected at times to more than one output port (receive station) in a *one-to-many* fashion. This one to many communication mode is referred to as *broadcasting*. Generally, in a broadcast connection from a transmit station to receive stations, it is only of interest to connect an output port (receive station) at any given time to at most one input port (transmit station). A broadcast *switching network* must be capable of simultaneously providing multiple broadcast connections from the input ports to the output ports with the restriction that no output port can ever be connected at a given time to more than one input port.

There have been a variety of techniques developed with respect to switching networks. U.S. Pat. No. 4,402,008 to Teraslinna discloses a wide band switching architecture. The wide band switching architecture allows wide band signals to be communicated through a wide band switching network with minimal crosstalk between the wide band signals. The wide band switching network is comprised of stages, each of which has a plurality of switching input and output arrays. Each input array has one input terminal and each output array has one output terminal. Each array is one integrated circuit, and crosstalk is reduced by allowing only one wide band signal to be present in each integrated circuit at any one time and by grounding all unused outputs and inputs in the arrays.

U.S. Pat. No. 4,696,000 to Payne discloses a non-blocking self-routing nodes. The broadcast nodes are responsive to the transmissions of address information from an input port to create a plurality of paths through the switching network to communicate on this plurality of paths the address information to the routing states. Each of the routing switch nodes is responsive to receipt of address information to select one of the paths to an address designated output port.

U.S. Pat. No. 4,651,318 to Luderer discloses a multi-stage packet switching network comprising a plurality of pack switch nodes for communicating broadcast and non-broadcast packets. Each node is responsive to receipt of one of the packets. If a broadcast packet has been received, the switch node transmits this packet to the next sequential stage on all output links interconnecting the switch nodes to the next sequential stage. If the packet is of a non-broadcast type, the switch node decodes the state identification field therein to determine which of the sets of the routing information is to be used for routing that non-broadcast packet to the next sequential stage.

U.S. Pat. No. 4,566,008 to Richards discloses a two-stage, rearrangeable multiconnection switching network for connecting N1 input channels to N2 output channels. The network comprises a number of first stage switches and a second stage switch. The second stage switch has N2 outlets, each connected to one of the N2 output channels. A connection arrangement connects each of the first stage switch ringlets to an associated predetermined input channel such that for any group N2 of input channels, there is a group of N2 of the first stage switches, each having one inlet connection to a different on that group N2 of the input channels. This patent to Richards also discloses that the network is extendable by adding second stage switches and connecting each additional second stage switch to each first stage switch. In larger networks, the first and second stage switches are themselves replaceable by two stage networks in accordance with the invention.

The problem that exists in realizing broadcast connections with a space-division switching network is that the network must have a fan-out capability. When fan-out is used to implement a broadcast connection from a single input port to multiple output ports, the resulting connecting path corresponds to a tree of connecting paths through the network where the input port is the root of the tree and the output ports are leaves of the tree. To establish a tree of connecting paths through a space-division switching network using fan-out is significantly more complex than establishing a set of one-to-one connecting paths. See G. M. Masson, "Upper bounds on fan-out in connection with networks,: IEEE Transactions on Circuit Theory", Vol. CT-20, pp. 222-230; 1973. Modifying the state of a space-division switching network employing fan-out to provide a new connection by rearranging trees of connecting paths is prohibitive.

Accordingly, to satisfy a broadcast connection, a space-division network must have connecting capabilities far in excess of that required for the one-to-one or permutation type of connection. To see this, note that a permutation network with N inputs must be able to realize N! assignments of inputs to outputs while a broadcast network with N inputs must be able to realize $N^N$ assignments. Because the switching modules comprising a broadcast network must have fan-out capabilities relative to their inputs and outputs, much of the well-established theory for the design and analysis of permutation networks is not applicable to the broadcast problem. It is the purpose of this invention to illustrate a broadcast switching structure that employs permutation switching modules linked with collections of broadcast modules in such a way that the broadcast modules from centralized hubs which solely provide the one-to-many or fan-out broadcast function.

SUMMARY OF THE INVENTION

The present invention pertains to a broadcast network. The broadcast network comprises N transmit stations, with each transmit station being capable of transmitting a signal and N being an integer $\geq 1$. There are also M receive stations, where M is an integer $\geq 2$; I switching stages where I is an integer $\geq 0$ and a broadcast hub. The broadcast hub and I switching stages are connected such that they are capable of linking the N transmit stations to the M receive stations so that any one of the N transmit stations can transmit a signal to L of the receive stations, where L is an integer and $1 \leq L \leq M$, but each receive station can receive a signal from only one of the N transmit stations at any given time. The broadcast hub and switching stages are arranged to simultaneously any number link more than one of the N transmit stations to desired receive stations at any given time.

DESCRIPTION OF THE PREFERRED EMBODIMENTS

Figure 1:
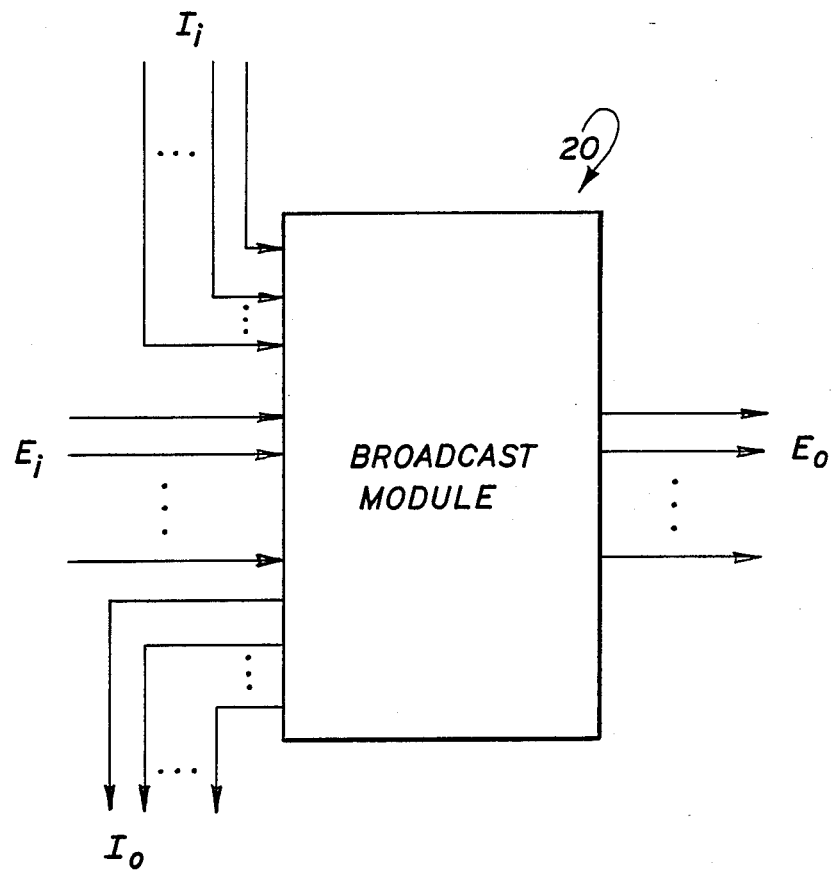
FIG. 1 is a schematic representation of a broadcast module.

Referring now to the drawings wherein like reference numerals refer to similar or identical parts throughout the several views, and more specifically to FIG. 1, there is shown a schematic drawing of a broadcast module 20. In general, a broadcast module has two distinct sets of input ports and two distinct sets of output ports:

1. a set of q external input ports denoted as $E_i = \{e_{i1}, e_{i2}, \ldots, e_{iq}\}$ 2. a set of r external output ports denoted as $E_o = \{e_{o1}, e_{o2}, \ldots, e_{or}\}$ 3. a set of s intermodule or internal input ports denoted $I_i = \{i_{i1}, i_{i2}, \ldots, i_{is}\}$ 4. a set of t intermodule or internal output ports denoted $I_o = \{i_{o1}, i_{o2}, \ldots, i_{ot}\}$.

The first letter of the subscript of an external or internal port denotation identifies it as an input port, i, or output port, o. The second letter identifies which internal or external input port or output port it is of the set of internal or external input ports or output ports. In general, $(|E_i| = q) \neq (|E_o| = r) \neq (|I_i| = s) \neq (|I_o| = t)$ where $|A|$ denotes cardinality or size of the set A. Finally, $|E_i| \geq 0$, $|E_o| \geq 0$, $|I_i| \geq 0$, and $|I_o| \geq 0$.

For purposes of identification herein, for any given broadcast module represented schematically, the most vertical input port or output port, whether it be an internal or external input or output, is the lowest indexed input or output port (that is, $e_{i1}$, $e_{o1}$, $i_{i1}$, $i_{o1}$). The least vertical input or output is the highest indexed input or output port (that is, $e_{ig}$, $e_{or}$, $i_{is}$, $i_{ot}$). The identity of any given external/internal input or output is determined by position relative to the other inputs and outputs. The external or internal inputs or outputs are distinct, and their identity is counted from 1 to q for the external inputs, from 1 to r for the external outputs, from 1 to s for the internal inputs, and from 1 to t for the internal outputs.

The external inputs and outputs provide for data or signal flow into and out of the broadcast structure that the broadcast modules have been linked together to form; the intermodule inputs and outputs provide for data or signal flow among the broadcast modules in the structure. These broadcast module inputs and outputs can pass signals or data serially or in parallel depending on the broadcast application.

There is complete fan-out capability between the inputs and the outputs of a broadcast module. In other words, under the restriction that each output can be connected to at most one input in a broadcast module, any external or intermodule/internal input can transmit data to any number (indeed, perhaps all) of the external-/internal outputs.

A broadcast module is distinct from a switching module. In a switching module there are only external inputs and external outputs and only one-to-one connections are possible between these external inputs and external outputs. In other words, there is no fan-out capability. A switching module can be viewed as a much less complex, less expensive device when compared to a broadcast module.

A state of a broadcast module is defined in terms of the connections established between the input ports and output ports in the module. For example, a broadcast module 34, as used in the broadcast structure of FIG. 6, has one external input port $e_{i1}$; one external output port $e_{o1}$; one internal input port $i_{il}$ and one internal output port $i_{o1}$. There are 27 possible states ($3^3$) for such a broadcast module 34, as shown in Table 1. In general, a broadcast module can be placed in any of $(q+s)^{r+t}$ states relative to input to output connections. This is generally accomplished by well-know control means that can also be linked throughout the overall broadcast network system to enable a signal to move through the network as desired. See for instance, Benes, *Mathematical Theory of Connecting Networks and Telephone Traffic*, Academic Press, New York, 1965.

TABLE 1

| $e_{o1}$ | $i_{o1}$ | $i_{o2}$ |
| --- | --- | --- |
| $e_{i1}$ | $e_{i1}$ | $e_{i1}$ |
| $e_{i1}$ | $e_{i1}$ | $i_{i1}$ |
| $e_{i1}$ | $e_{i1}$ | $i_{i2}$ |
| $e_{i1}$ | $i_{i1}$ | $e_{i1}$ |
| $e_{i1}$ | $i_{i1}$ | $i_{i1}$ |
| $e_{i1}$ | $i_{i1}$ | $i_{i2}$ |
| $e_{i1}$ | $i_{i2}$ | $e_{i1}$ |
| $e_{i1}$ | $i_{i2}$ | $i_{i1}$ |
| $e_{i1}$ | $i_{i2}$ | $i_{i2}$ |
| $i_{i1}$ | $e_{i1}$ | $e_{i1}$ |
| $i_{i1}$ | $e_{i1}$ | $i_{i1}$ |
| $i_{i1}$ | $e_{i1}$ | $i_{i2}$ |
| $i_{i1}$ | $i_{i1}$ | $e_{i1}$ |
| $i_{i1}$ | $i_{i1}$ | $i_{i1}$ |
| $i_{i1}$ | $i_{i1}$ | $i_{i2}$ |
| $i_{i1}$ | $i_{i2}$ | $e_{i1}$ |
| $i_{i1}$ | $i_{i2}$ | $i_{i1}$ |
| $i_{i1}$ | $i_{i2}$ | $i_{i2}$ |
| $i_{i2}$ | $e_{i1}$ | $e_{i1}$ |
| $i_{i2}$ | $e_{i1}$ | $i_{i1}$ |
| $i_{i2}$ | $e_{i1}$ | $i_{i2}$ |
| $i_{i2}$ | $i_{i1}$ | $e_{i1}$ |
| $i_{i2}$ | $i_{i1}$ | $i_{i1}$ |
| $i_{i2}$ | $i_{i1}$ | $i_{i2}$ |

TABLE 1-continued

| $e_{o1}$ | $i_{o1}$ | $i_{o2}$ |
| --- | --- | --- |
| $i_{i2}$ | $i_{i2}$ | $e_{i1}$ |
| $i_{i2}$ | $i_{i2}$ | $i_{i1}$ |
| $i_{i2}$ | $i_{i2}$ | $i_{i2}$ |

Figure 3:
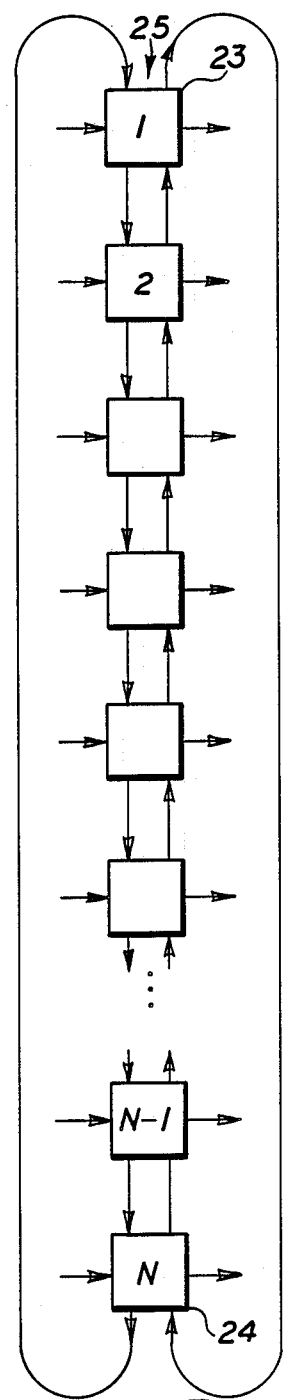
FIG. 3 is a schematic representation of a broadcast ring.

The first line of Table 1 identifies the three outputs of the broadcast module of FIG. 3. The 27 lines underneath the first line of Table 1 are each comprised of three inputs and list the various states or connections between the inputs and the outputs. For instance, the first of these lines indicates that the $e_{i1}$ input port is connected to each output port. This is but one state. It should be noted that, for broadcast purposes, only those states which have no more than one input connected to any number of the outputs are allowed. Thus, while there are more states, such as the $e_{i1}$ and $i_{i1}$ input ports connected to the $e_{o1}$ output port, this is not a valid state.

The broadcast modules can be linked together to form different types of structures. These structures serve as *broadcast hubs* in broadcast switching networks. Signal or data fan-out in the invented broadcast switching networks takes place only within the broadcast hubs.

Figure 2:
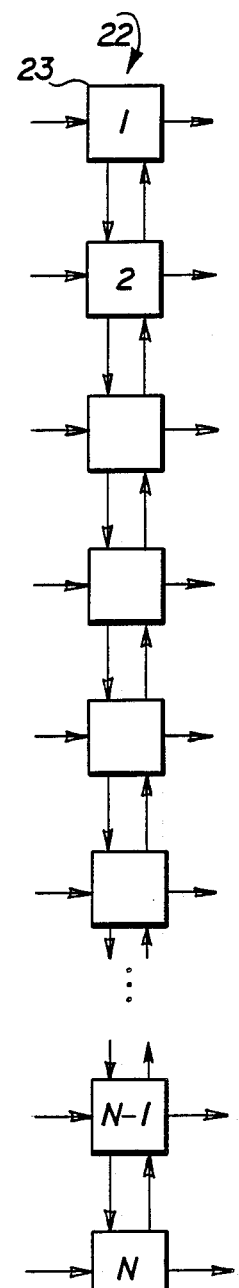
FIG. 2 is a schematic representation of a broadcast vector.

The most basic broadcast hub is a broadcast vector 22. FIG. 2 shows an example of a broadcast vector 22 where there are N vertically linked (via internal inputs and outputs) broadcast modules. Other than the most and least vertical broadcast modules in the broadcast vector, the broadcast modules are directly linked only to their neighboring two broadcast modules. The most vertical broadcast module 23 and the least vertical broadcast module 24 are only directly linked to one other broadcast module and are not directly linked to each other.

FIG. 3 shows a structure wherein the broadcast modules form a broadcast ring 25. In a broadcast ring the most vertical and least vertical broadcast modules are linked to each other with the remaining structure identical to the broadcast vector of FIG. 2. For exemplary purposes FIGS. 2 and 3 have only one external input, one external output, two internal inputs, and two internal outputs.

Figure 6:
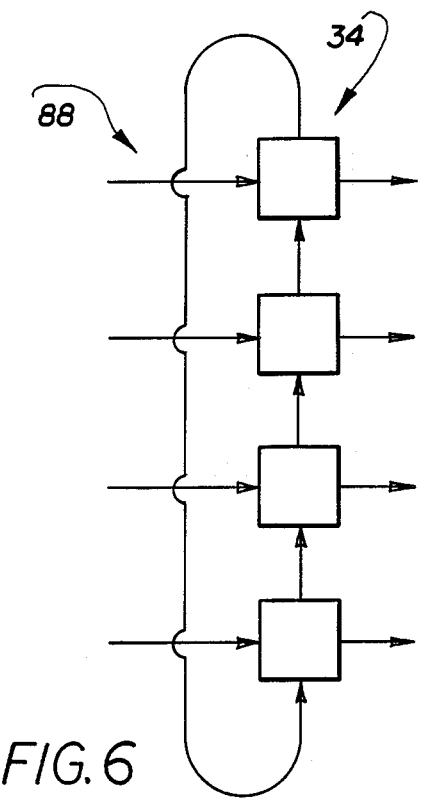
FIG. 6 is a schematic representation of a 4-input to 4-output broadcast ring.

The most elementary of all broadcast modules has $|E_i|=E_o|=|I_i|=|I_{o1}|=1$. FIG. 6 shows a 4-input to 4-output broadcast ring 88 composed of such a broadcast module. As is seen in the following, broadcast switching networks utilizing such limited broadcast modules have greater demands on their connectivity for the realization of broadcast assignments than those that utilize more robust broadcast modules.

Figure 4:
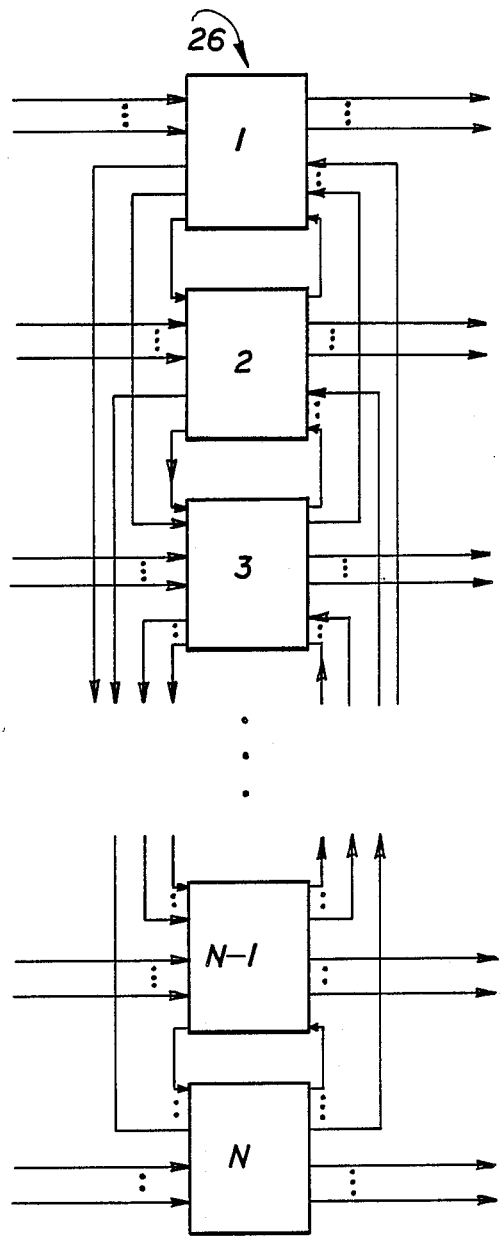
FIG. 4 is a schematic representation of a broadcast hyper-ring.

FIG. 4 shows a broadcast structure wherein the broadcast module forms a broadcast hyper-ring 26. A broadcast hyper-ring is composed of broadcast modules that are directly linked to other and/or more than their nearest neighbor broadcast modules in the broadcast ring. This linking of broadcast modules in a broadcast structure by means of internal inputs and outputs is called *threading*.

In the example shown in FIG. 4, each broadcast module is linked to every other broadcast module, and the threading is said to be *complete*.

Figure 5:
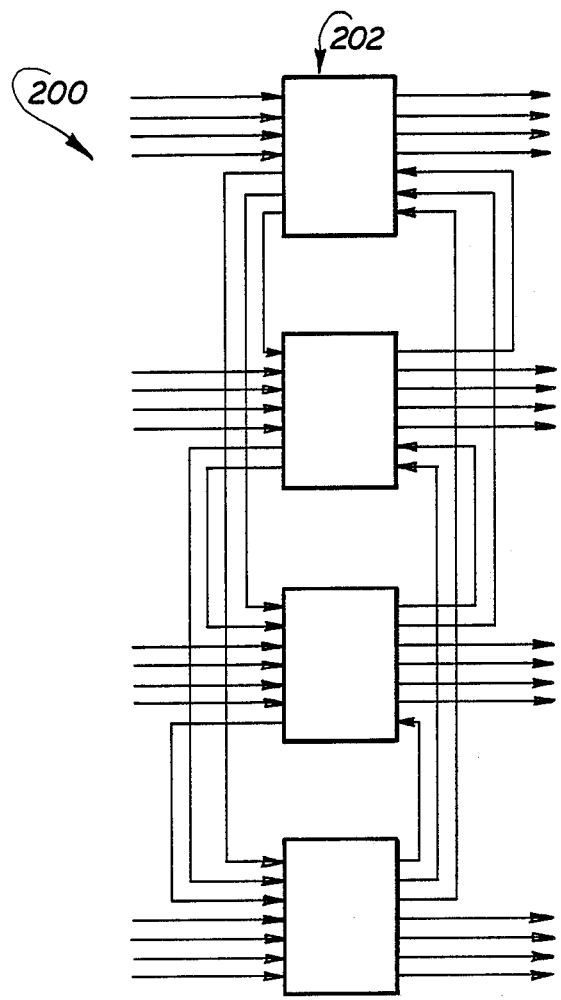
FIG. 5 is a schematic representation of a broadcast hyper-ring having 4 broadcast modules.

FIG. 5 shows a 16-input to 16-output broadcast hyper-ring 200. For each broadcast module 202 therein there are four external inputs, four external outputs, three intermodule/internal inputs, and three intermodule array outputs. That is, $|E_i|=|E_o|=4$ and $|I_i| = |I_o| = 3$. In FIG. 5 each of the four broadcast modules has a link to each of the other broadcast modules. That is, the threading is complete. In general, the broadcast modules in a broadcast vector, ring, or hyper-ring have links to only a subset of the other broadcast modules in the broadcast vector, ring, or hyper-ring. That is, the threading is incomplete. These links can be single links as shown in FIG. 5, or the links can be multiple/redundant links.

Figure 7:
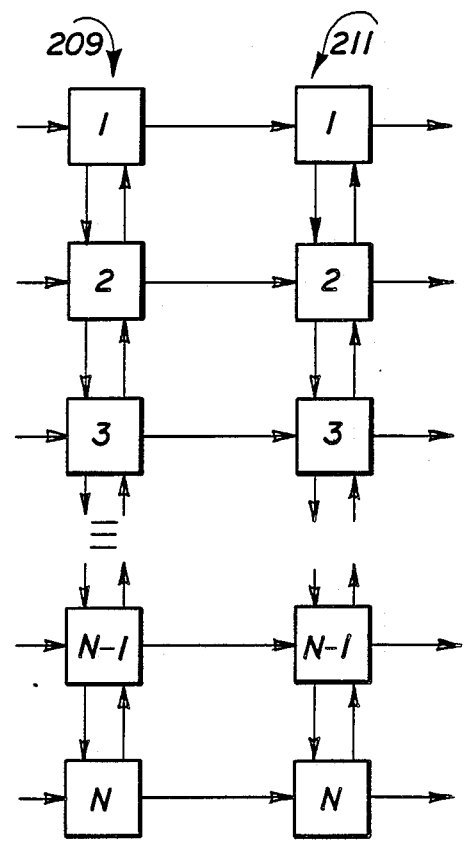
FIG. 7 is a schematic representation of 2 broadcast vectors linked together to form a broadcast hyper-ring.
Figure 8:
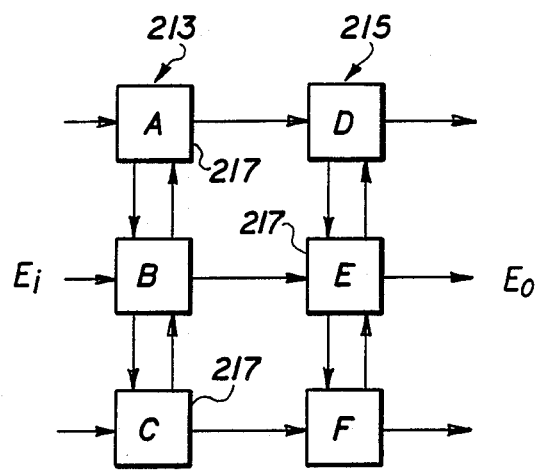
FIG. 8 is a schematic representation of 2 vectors, each of which have 3 broadcast modules, that are linked to form a broadcast hyper-ring.
Figure 9:
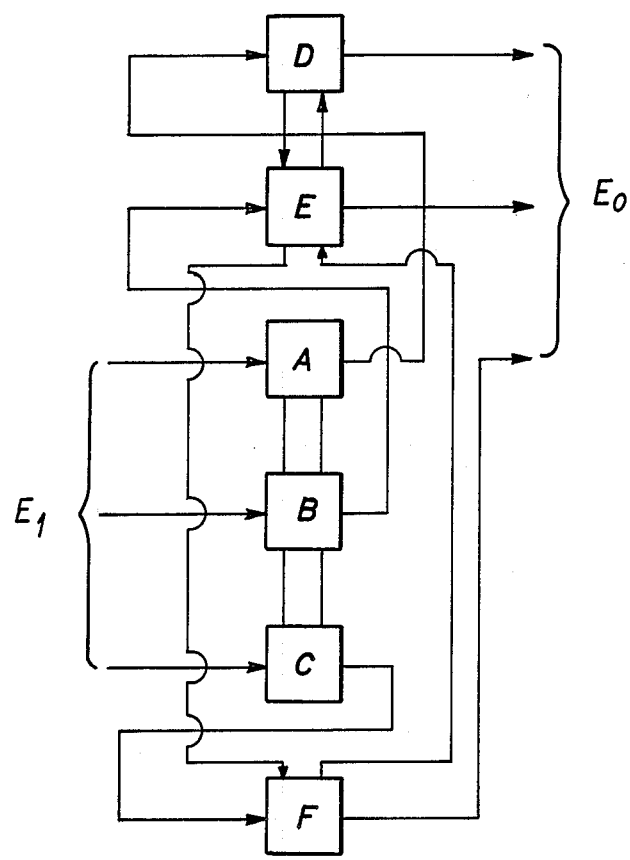
FIG. 9 is a schematic representation of a broadcast vector equivalent to the broadcast hyper-ring shown in FIG. 8.

FIG. 7 shows another example of a broadcast hyper-ring. This hyper-ring is composed of two vectors 209, 211. To better understand this class of hyper-ring structure, observe the explicit example given in FIG. 8 of two vectors 213, 215 having three broadcast modules 217 each. In FIG. 9 an equivalent version of the structure of FIG. 8 is given. It is seen that in this hyper-ring, broadcast modules A, B, and C have external inputs, internal inputs and outputs, but no external outputs; similarly, broadcast modules D, E, and F have external outputs, internal inputs and outputs, but no external inputs. Yet the same overall results with respect to internal and external connections of the structure in FIG. 8 is achieved.

Figure 10:
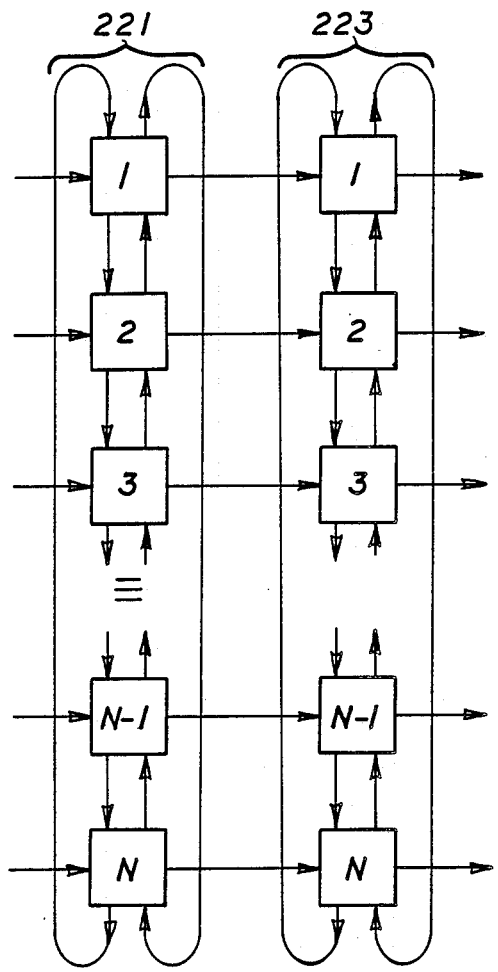
FIG. 10 is a schematic representation of 2 broadcast rings linked to form a broadcast hyper-ring.

FIG. 10 shows another broadcast hyper-ring composed of two rings 221, 223. Clearly, this is similar to the structure of FIG. 7 except the broadcast modules 1 and N of these two rings 211, 223 are directly linked. It should be clear that broadcast hyper-rings composed of combinations of vectors, rings, and other hyper-rings are also possible.

Figure 11:
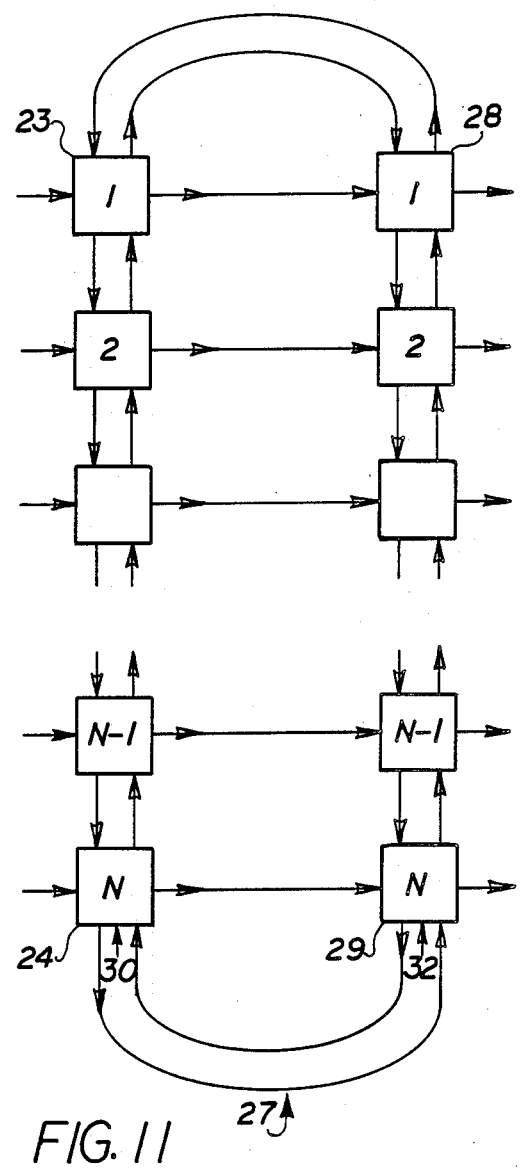
FIG. 11 is a schematic representation of 2 broadcast vectors linked to form a broadcast hyper-ring.
Figure 12:
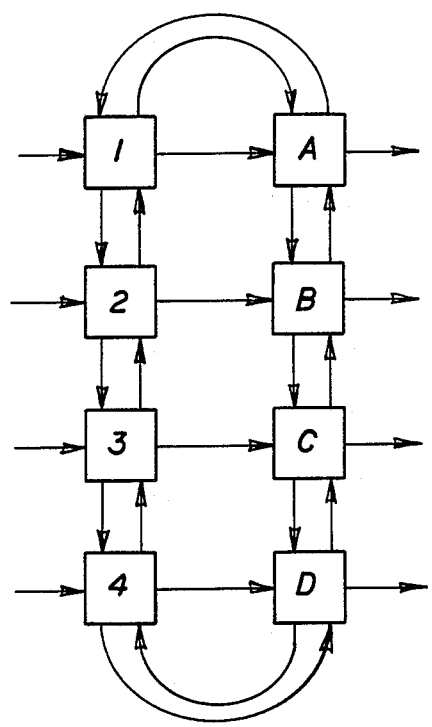
FIG. 12 is a schematic representation of 2 broadcast vectors, each composed of 4 broadcast modules, linked to form a broadcast hyper-ring.
Figure 13:
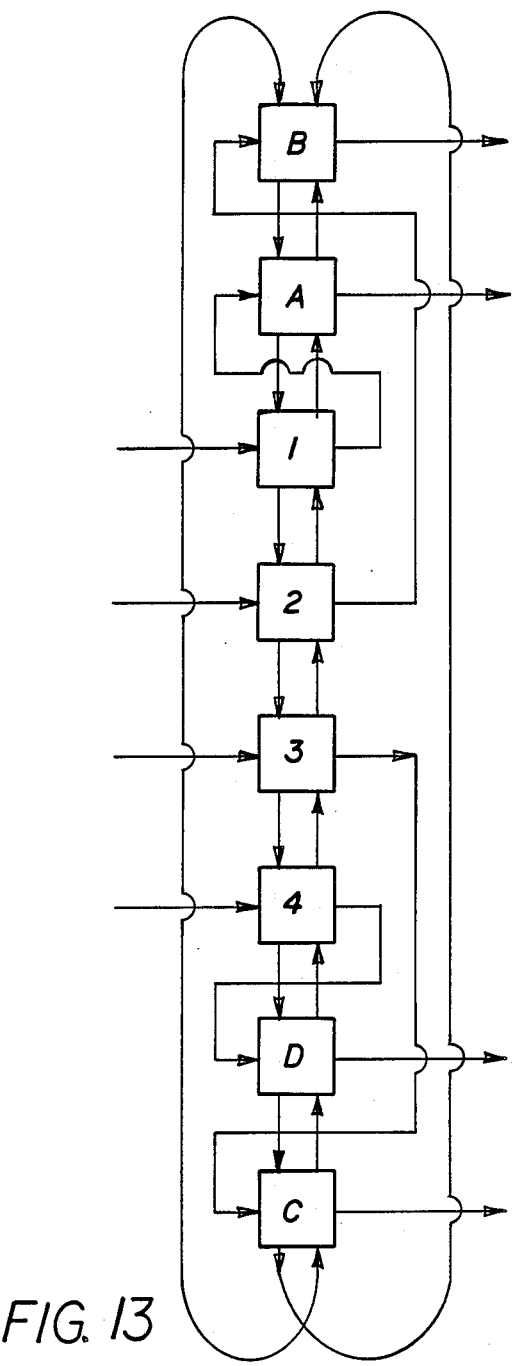
FIG. 13 is a schematic representation of a broadcast hyper-ring equivalent to the broadcast hyper-ring shown in FIG. 12.
Figure 14:
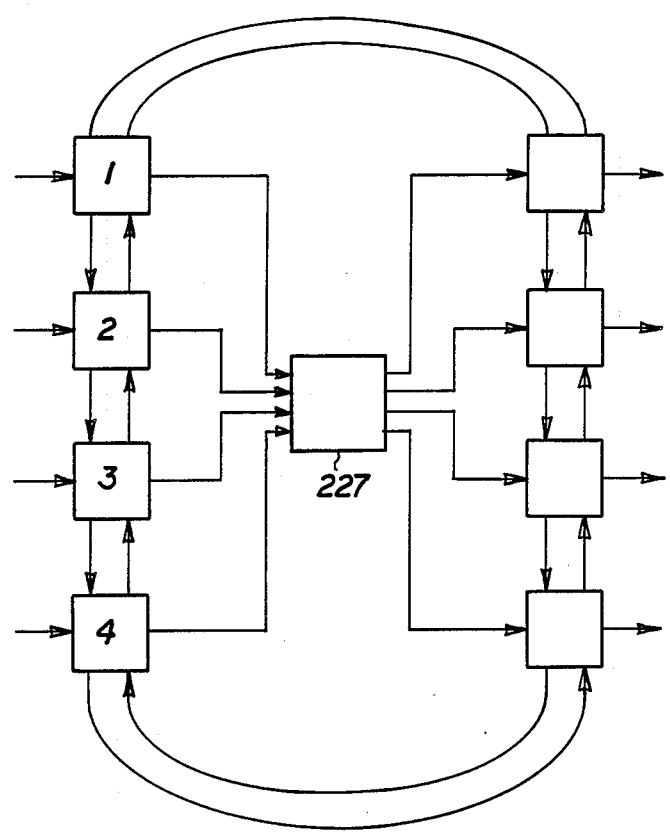
FIG. 14 is a schematic representation of a switch threaded broadcast hyper-ring.

FIG. 11 shows another example of a hyper-ring 27. In the example of a hyper-ring shown in FIG. 11, the most vertical broadcast module 23 of the broadcast vector 30 is linked to the most vertical broadcast module 28 of the broadcast vector 32. Additionally, the least vertical broadcast module 24 of the broadcast vector 30 is linked to the least vertical broadcast module 29 of the broadcast vector 32. The distinction between this class of hyper-ring and that previously shown can be better understood from FIG. 12 and FIG. 13. FIG. 12 shows such a hyper-ring involving eight broadcast modules. FIG. 13 shows the exact same structure but where the threading of the linkage among the broadcast modules is more apparent. In the previously shown hyper-rings, each broadcast module A, B, C, and D have external outputs, and only broadcast modules, 1, 2, 3, and 4 have external inputs. Broadcast modules 1, 2, 3, and 4 have only internal outputs, and broadcast modules A, B, C, and D have only internal inputs. The threading of links among the modules is more complex relative to that of the hyper-rings previously shown. One final variation of a hyper-ring permits the threading to be varied by placing switching modules 227 between the internal inputs and outputs. An example of a switch-threaded broadcast hyper-ring is shown in FIG. 14.

Figure 15:
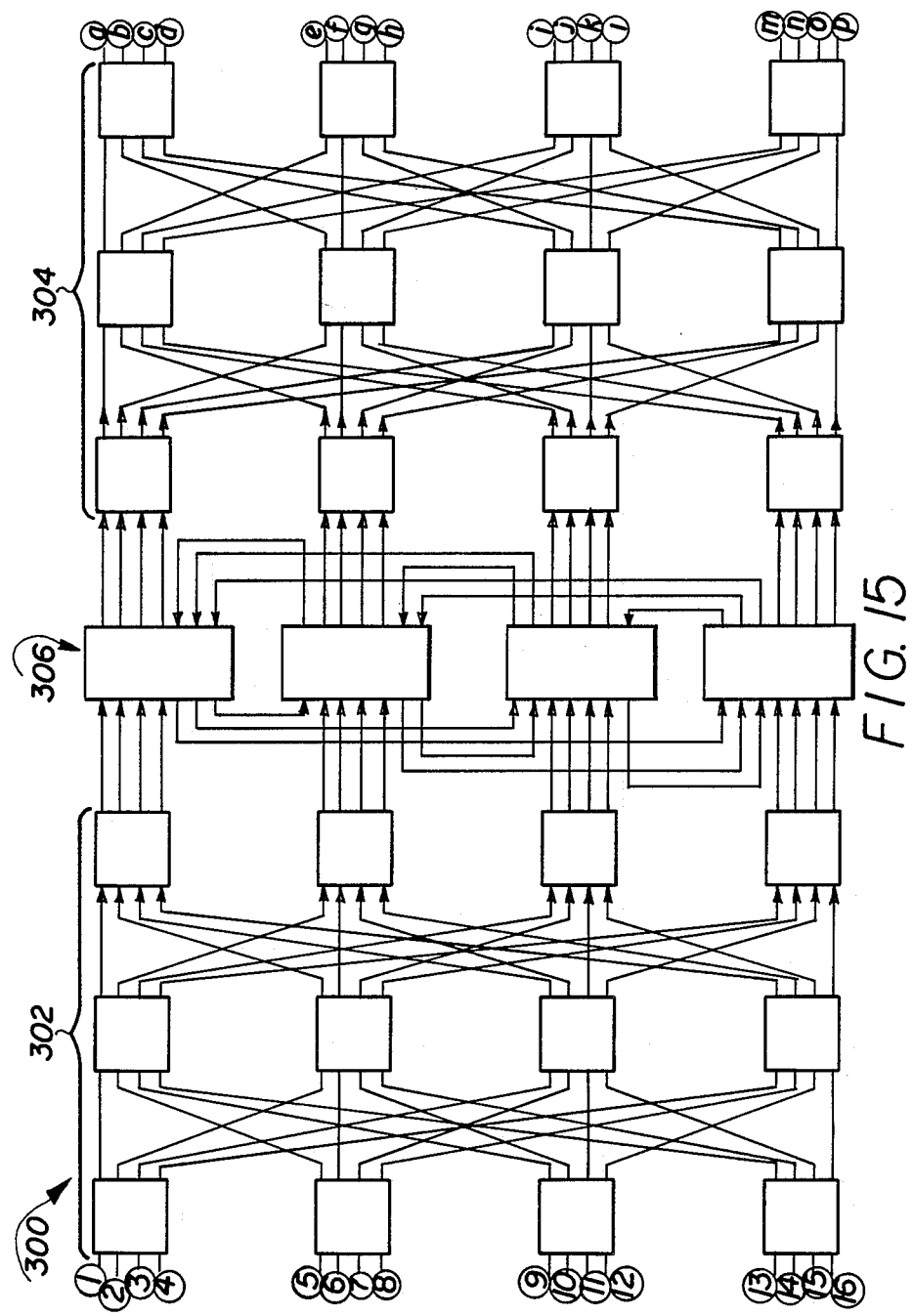
FIG. 15 is a schematic representation of a 16-input to 16-output broadcast switching network.

Broadcast switching networks can be formed by embedding broadcast hubs into structures otherwise composed of switching modules (that unto themselves can only provide one-to-one or permutation interconnection capability). The most basic design of a broadcast switching network simply places a broadcast vector, ring, or hyper-ring between two permutation switching networks. This is referred to as a PBD network. FIG. 15 shows a 16-input to 16-output PBD broadcast switching network. It consists of a 16-input to 16-output three-stage space-division permutation network, called the presentation network 302, linked to the external inputs of a broadcast hyper-ring 306, followed by another 16-input to 16-output space-division permutation network, called the distribution network 304, linked to the external outputs of the same broadcast hyper-ring 306. The two 16-input to 16-output permutation networks are comprised of linked (4×4) switching modules. The (4×4) switching modules need only have one-to-one connection capability from their inputs to their outputs for this overall PBD structure to provide broadcast switching capability.

The 16-input to 16-output permutation network on the left-hand side of the broadcast hyper-ring 306 shown in FIG. 15 serves as a presentation network 302 to the broadcast hyper-ring 306 in that its function is to provide a single linking path from each transmit station input port to some external input of the broadcast hyper-ring 306. The 16-input to 16-output permutation network on the right-hand side of the hyper-ring serves as a distribution network 304 from the broadcast hyper-ring 306 in that its function is to provide a one-to-one linking path from each external output of the broadcast hyper-ring 306 to which a broadcast hyper-ring 306 input has transmitted a signal or data to the appropriate network output destination. In other words, the presentation network 302 presents the signal or data to be broadcast to the receive station of the broadcast hyper-ring 306, and the distribution network 304 distributes the signal or data emanating from the broadcast hyper-ring 306 to the appropriate receive stations. The broadcast hyper-ring 306, in addition to performing the broadcast function, must also align the signal or data to accommodate the transfer from the presentation network 306 to the distribution network 304. The ability of the broadcast hyper-ring 306 to do this depends on parameters of its structure such as $|E_i|$, $|E_o|$, $|I_i|$, and and $|I_o|$ and the threading of the internal/intermodule connecting links.

It should be appreciated that the presentation and distribution networks 302, 304 do not necessarily have to function as complete permutation networks in order for the overall structure to provide complete broadcast capability. Indeed, broadcast switching network designs shall be shown below wherein the presentation/distribution networks 302, 304 employed cannot perform all permutations. The interplay among the three components of a PBD network, (that is, the presentation network, the broadcast vector, ring, or hyper-ring, and the distribution network) is critical to the operation of the invented broadcast switching network.

A decomposition technique by which the broadcast switching network design approach of employing the functional triplex of presentation, distribution, and broadcast can be iteratively used is implicit in the design shown in FIG. 15. Note that in FIG. 15, a 16-input to 16-output broadcast switching network 300 has been designed by using two 16-input to 16-output permutation networks, a presentation network 302 and a distribution network 304, and a broadcast structure which is shown here as a broadcast hyper-ring 306. In other words, the large broadcast switching network was designed by using permutation networks (for which a multitude of designs are known) and smaller broadcast networks. The same design concept could now be repeated for each individual broadcast network. Iterating the design in this way would eventually lead to the point where the broadcast network would be realizable with elementary broadcast modules.

Figure 16:
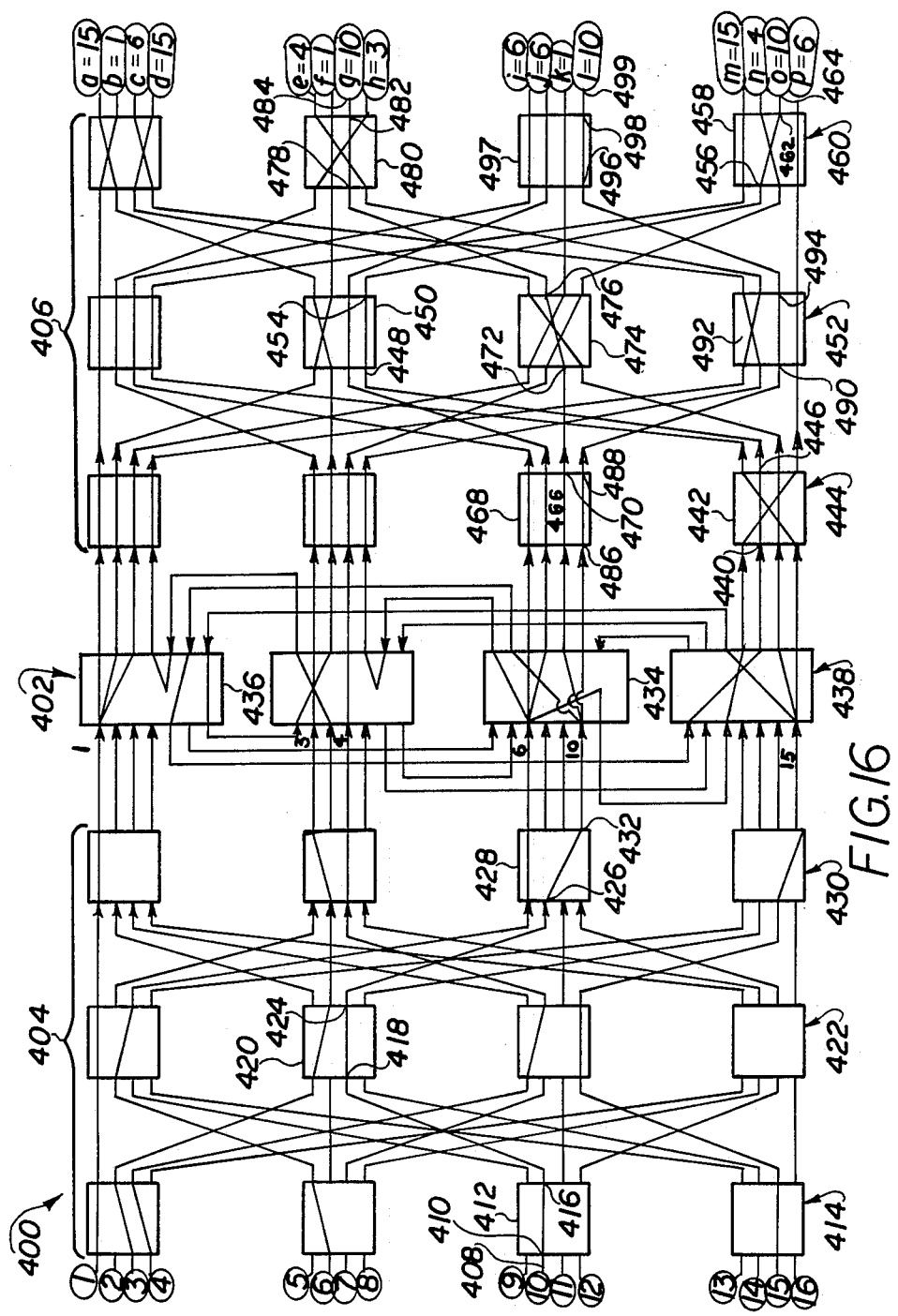
FIG. 16 is a schematic representation of a broadcast switching network with a broadcast hyper-ring realizing a broadcast assignment.

Realization of a broadcast assignment is shown in FIG. 16. These broadcast assignments involve a transmission to each output in the broadcast switching network 400. To denote a broadcast assignment, the transmit station can be denoted by the set 1,2 ... 16 and the receive stations can be denoted by the set a, b, ..., p. The broadcast assignment can then be described by the following broadcast connections:

(1→O$_1$), (2→O$_2$), ... (16→O$_{16}$)

where O$_j$ is the subset of the receive station set denoting the outputs to which transmit station j is to broadcast its signal or data. Accordingly, the example broadcast assignment of FIG. 16 is represented by (1→(b, f, k)), (3→(h)), (4→(e, n)), (6→(c, i, j, p)),(10→(g, l, o))(15→(a, d, m))

In this broadcast assignment representation, those transmit stations which are not connected to receive stations in the assignment are not represented. In the realization of these broadcast connections as depicted in FIG. 16, it is seen that the broadcast hyper-ring 402 is the only part of the broadcast switching network 400 providing fan-out. The presentation network 404 and the distribution network 406 are only providing permutation connections relative to their inputs and outputs. Moreover, the paths through the presentation network 404 emanate only from transmit stations 1,3,4,6,10, and 15. (The circuitous path by which transmit station 10 is connected to output o is particularly worth noting in FIG. 16 as it illustrates the flexibility with which fan-out can be implemented with the threading pattern used in the broadcast hub.)

Consider, for instance, the realization of broadcast connection (10→(g, l, o)) in FIG. 16. The transmit port 408 of transmit station 10 is interfaced to the second input port 410 of switch 412. Switch 412 is in the first switching stage 414 of presentation network 404. The second input port 410 of switch 412 is connected to the second output port 416 of switch 412. The second output port 416 of switch 412 is linked to the third input port 418 of switch 420. Switch 420 is in the second switching stage 422 of presentation network 404. The third input port 418 of switch 420 is connected to the third output port 424 of switch 420. The third output port 424 of switch 420 is linked to the second input port 426 of switch 428. Switch 428 is in the third switching stage 430 of presentation network 404. The second input port 426 of switch 428 is connected to the fourth output port 432 of switch 428. The fourth output port 432 of switch 428 is linked to the e$_{i4}$ input port of broadcast module 434. Fan-out takes place in broadcast module 434 in broadcast hyper-ring 402. Broadcast hyper-ring 434 is in such a state that the e$_{i4}$ input port is fanned-out to the i$_{o2}$, e$_{o3}$, and e$_{o4}$ output ports of broadcast module 434.

The i$_{o2}$ output port of broadcast module 434 is linked to the i$_{i2}$ input port of broadcast module 436. Broadcast module 436 is in a state such that the i$_{i2}$ input port of broadcast module 436 is connected to the i$_{o1}$ output port of broadcast module 436. The i$_{o1}$ output port of broadcast module 436 is connected to the i$_{il}$ input port of the broadcast module 438. Broadcast module 438 is in broadcast hyper-ring 402. The i$_{il}$ input port of broadcast module 438 is connected to the e$_{o2}$ output port of broadcast module 438. The e$_{o2}$ output port of broadcast module 438 is linked to the second input port 440 of switch 442. Switch 442 is in the first switching stage 444 of distribution network 406. The second input port 440 of switch 442 is connected to the second output port 446 of switch 442. The second output port 446 of switch 442 is linked to the fourth input port 448 of switch 450. Switch 450 is in the second switching stage 452 of distribution network 406. The fourth input port 448 of switch 450 is connected to the fourth output port 454 of switch 450. The fourth output port 454 of switch 450 is linked to the second input port 456 of switch 458. Switch 458 is in the third switching stage 460 of distribution network 406. The second input port 456 of switch 458 is connected to the third output port 462 of switch 458. The third output port 462 of switch 458 is interfaced to the receive port 464 of receive station o.

The e$_{o3}$ output port of broadcast module 434 is linked to the third input port 466 of switch 468. Switch 468 is in switching stage 444. The third input port 466 of switch 468 is connected to the third output port 470 of switch 468. The third output port 470 of switch 468 is linked to the third input port 472 of switch 474. Switch 474 is in switching stage 452. The third input port 472 of switch 474 is connected to the second output port 476 of switch 474. The second output port 476 of switch 474 is connected to the third input port 478 of switch 480. The third input port 478 of switch 480 is connected to the third output port 482 of switch 480. The third output port 482 of switch 480 is interfaced to the receive port 484 of receive station g.

The e$_{o4}$ output port of broadcast module 434 is connected to the fourth input port 486 of switch 468. The fourth input port 486 of switch 468 is connected to the fourth output port 488 of switch 468. The fourth output port 488 of switch 468 is linked to the third input port 490 of switch 492. Switch 492 is in switching stage 452. The third input port 490 of switch 492 is connected to the third output port 494 of switch 492. The third output port 494 of switch 492 is linked to the fourth input port 496 of switch 497. Switch 497 is in switching stage 460. The fourth input port 496 of switch 497 is connected to the fourth output port 498 of switch 497. The fourth output port 498 of switch 497 is interfaced to the receive port 499 of receive station 1.

The other connecting paths depicted in broadcast switching network 400, which allow the additional broadcast connections of the example broadcast assignment to be realized, are not described. However, such connecting paths are similar to that discussed for broadcast connection (10→(g, l, o)), except that different broadcast modules and switches, or different input and output ports of the same broadcast modules and switches are utilized, as is apparent from FIG. 16.

Figure 17:
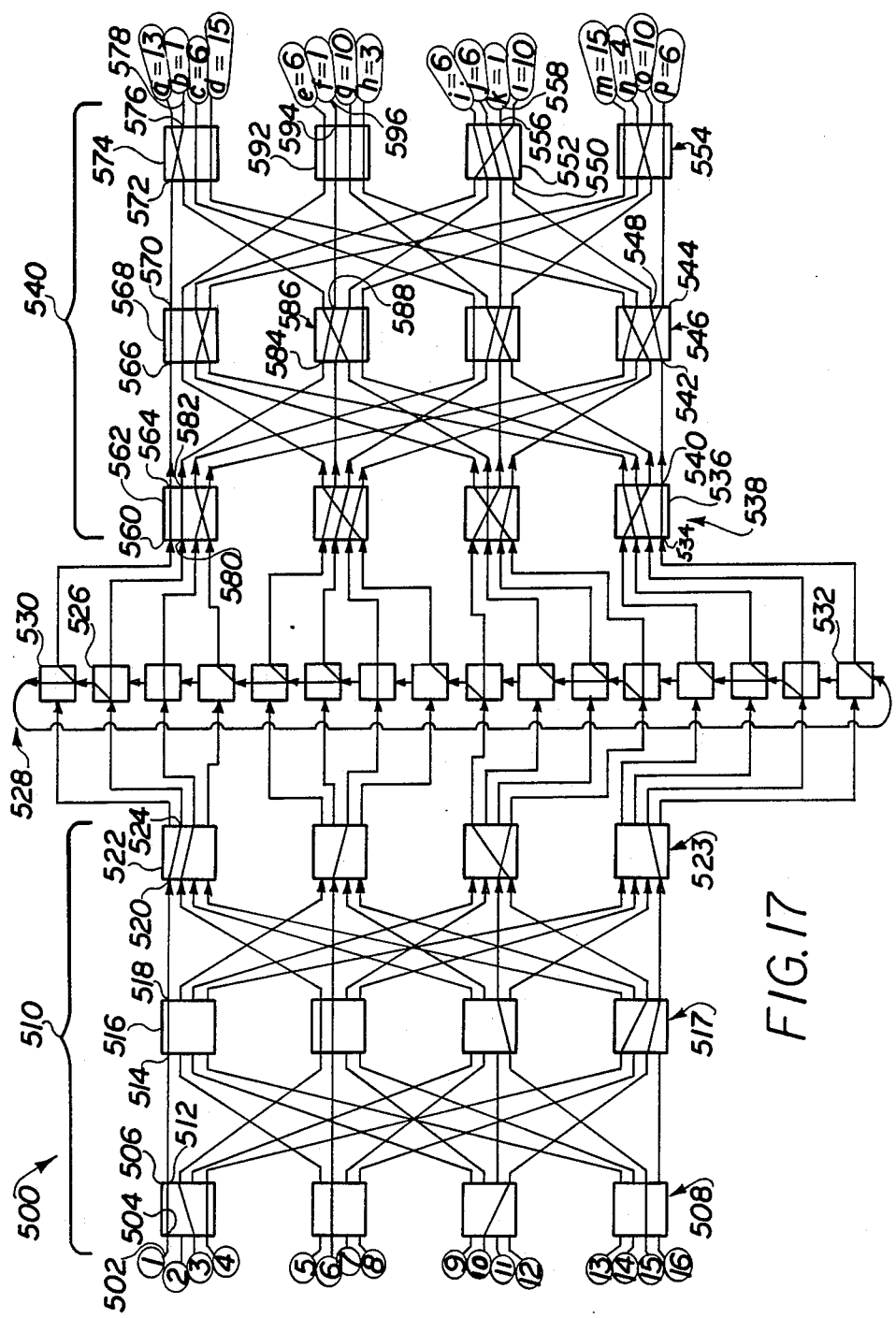
FIG. 17 is a schematic representation of a 16-input to 16-output broadcast switching network utilizing a broadcast ring realizing a broadcast assignment.

In FIG. 17, another realization of the example broadcast assignment used in FIG. 16 is shown for a PBD broadcast switching network 500 utilizing a broadcast ring 528 composed of the elementary broadcast modules depicted in FIG. 6 where $|E_i| = |E_o| = |I_i| = |I_o| = 1$. It should be appreciated that there is significantly less flexibility in the ways in which a broadcast assignment can be realized with this broadcast switching network 500 relative to the broadcast switching network 300 shown in FIG. 15. This is because it is only possible for the broadcast ring 528 to fan-out the signals to be transmitted to the distribution network in restricted sequences.

Consider, for instance, the realization of broadcast assignment (1→(b, f, k)). The transmit port 502 of transmit station 1 is interfaced to the first input port 504 of switch 506 in the first switching stage 508 in the presentation network 510. The first input port 504 of switch 506 is connected to the first output port 512 of switch 506 which in turn is linked to the first input port 514 of switch 516. Switch 516 is in the second switching stage 517 of the presentation network 510. The first output port 518 of switch 516 is linked to the first input port 520 of switch 522. Switch 522 is in the third switching stage 523 of the presentation network 510. The first input port 520 of switch 522 is connected to the second output port 524 of switch 522. The second output port 524 of switch 522 is connected to the $e_{il}$ input port of broadcast module 526 of broadcast hyper-ring 528. Broadcast module 526 is in a state such that the $e_{il}$ input port thereof is fanned-out to the $i_{o1}$ output port and to the $e_{o1}$ output port of broadcast module 526.

The $i_{o1}$ output port of broadcast module 526 is linked to the $i_{il}$ input port of broadcast module 530. The $i_{il}$ input port of broadcast module 530 is in a state such that the $i_{il}$ input port thereof is fanned-out to the $e_{o1}$ output port and the o1 $i_{o1}$ output port of broadcast module 530.

The $i_{o1}$ output port of broadcast module 530 is linked to the $i_{il}$ input port of broadcast module 532. The broadcast module 532 is in a state such that the $i_{il}$ input port thereof is connected to the $e_{o1}$ output port of broadcast module 532. The $e_{o1}$ output port of broadcast module 532 is linked to the fourth input port 534 of switch 536. Switch 536 is in the first switching stage 538 of distribution network 540. The fourth input port 534 of switch 536 is connected to the fourth output port 540 of switch 530 which in turn is linked to the fourth input port 542 of switch 544 Switch 544 is in the second switching stage 546 of the distribution network 540. The fourth input port 542 of switch 544 is connected to the third output port 548 of switch 544. The fourth input port 550 of switch 552 is connected to the third output port 556 of switch 552. The third output port 556 of switch 552 is linked to the receive port 558 of receive station K.

The $e_{o1}$ output port of broadcast module 530 is linked to the first input port 560 of switch 562. Switch 562 is in the first switching stage 538. The first input port 560 of switch 562 is connected to the first output port 564 of switch 562. The first output port 564 of switch 562 is linked to the first input port 566 of switch 568. Switch 568 is in the second switching stage 546. The first input port 566 of switch 568 is connected to the first output port 570 of switch 568. The first output port 570 of switch 568 is linked to the first input port 572 of switch 574. Switch 574 is in the third switching stage 554. The first input port 572 of switch 574 is connected to the second output port 576 of switch 574. The second output port 576 of switch 574 is linked to the receive port 578 of receive station B.

The $e_{o1}$ output port of broadcast module 526 is linked to the second input port 580 of switch 562. The second input port 580 of switch 562 is connected to the second output port 582 of switch 562. The second output port 582 of switch 562 is linked to the first input port 584 of switch 586. Switch 586 is in the second switching stage 546. The first input port 584 of switch 586 is connected to the second output port 588 of switch 586. The second output port 588 of switch 586 is linked to the second input port 590 of switch 592. Switch 592 is in the third switching stage 554. The second input port 590 of switch 592 is connected to the second output port 594 of switch 592. The second output port 594 of switch 592 is linked to the receive port 596 of receive station F.

The other connecting paths depicted in broadcast switching network 500 which allow the additional broadcast assignments therein to be realized are not described. However, such connecting paths are similar to the connecting paths discussed for broadcast assignment (1→(b, f, k)), except that different broadcast modules and switches, or different input and output ports of the same broadcast modules and switches are utilized, as is apparent from FIG. 17.

Figure 18:
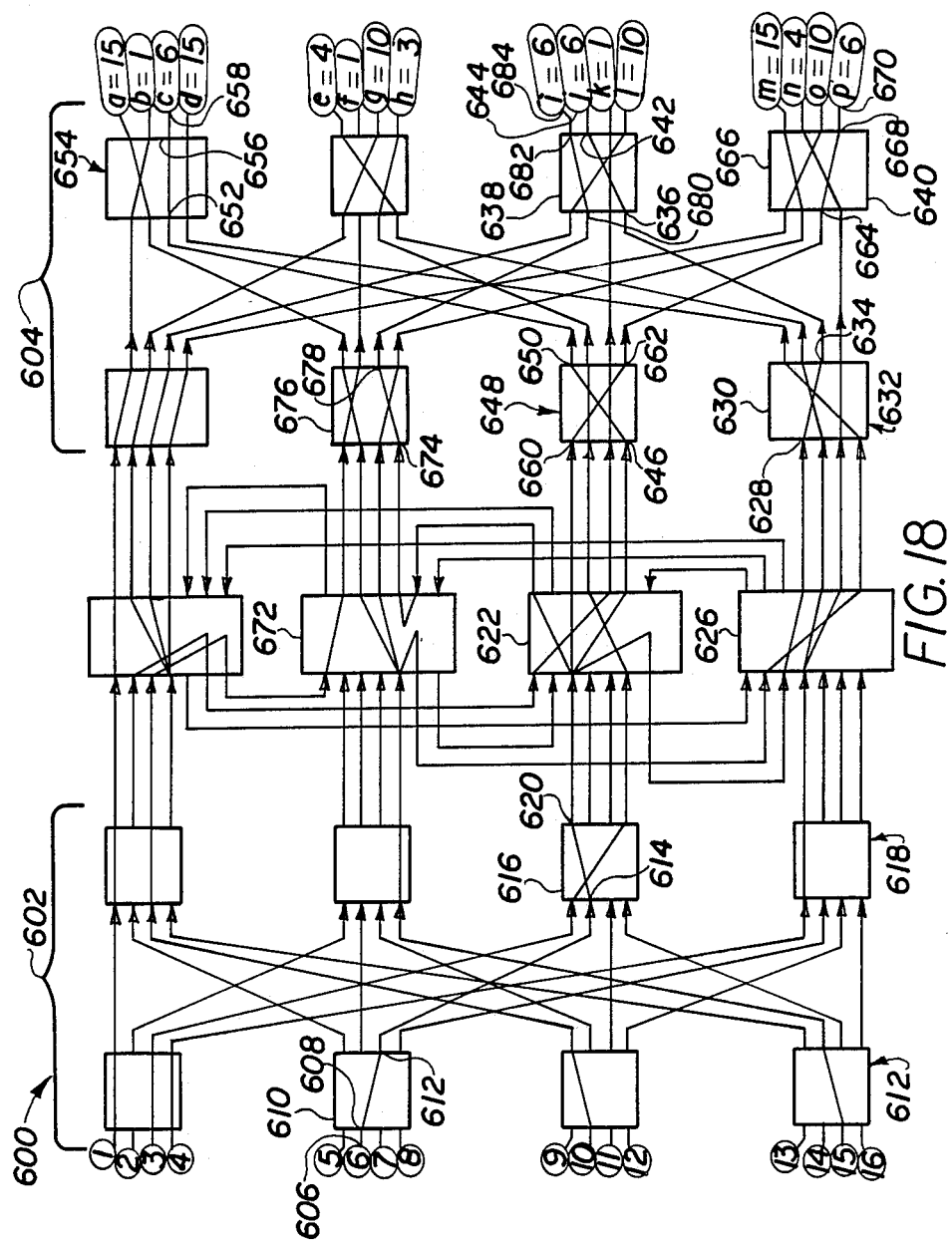
FIG. 18 is a schematic representation of a 16-input to 16-output broadcast switching network utilizing only two stages of switches realizing a broadcast assignment.

As was mentioned previously, for a PBD network to realize broadcast assignments, it is not necessary that a broadcast ring be placed directly between two complete permutation networks as shown in FIG. 15. FIG. 18 shows another version of a 16-input to 16-output broadcast switching network 600. In this 16-input to 16-output broadcast switching network, there are only two stages of (4×4)-switch modules comprising the distribution network 604. Clearly, neither the presentation network 602 nor the distribution network 604 can perform all permutations of its inputs onto its outputs. FIG. 18 also shows a realization of the same broadcast assignments considered in FIGS. 16 and 17 with this broadcast switching network 600. Observation of the broadcast switching network 600 shown in FIG. 18 reveals that it is the network 300 shown in FIG. 15 with the first and last switching stages of the presentation broadcast switching network and distribution network thereof deleted, respectively. The fact that the broadcast assignments can still be realized attests to the linking power of the broadcast hyper-ring being utilized. Broadcast switching network 600 depicts a realization of the example broadcast assignment:

(1→(b, f, k)),(3→(h)),(4→(e, n)),(6→(c, i, j, p)),(10→(g, l, o)),(15→(a, d, m)).

In order, for instance, for broadcast assignment (6→(c, i, j, p)) to be realized, the transmit port 606 of transmit station 6 is interfaced to the second input port 608 of switch 610. Switch 610 is in switching stage 612 of the presentation network 602. The second input port 608 of switch 610 is connected to the third output port 612 of switch 610. The third output port 612 of switch 610 is linked to the second input port 614 of switch 616. Switch 616 is in switching stage 618 of presentation network 602. The second input port 614 of switch 616 is connected to the first output port 620 of switch 616. The first output port 620 of switch 616 is linked to the $e_{il}$ input port of broadcast module 622. Broadcast module 622 is in broadcast hyper-ring 624. Broadcast module 622 is in a state such that the $e_{il}$ input port of broadcast module 622 is fanned-out to the $i_{o3}$, $i_{o1}$, $e_{o1}$, and $e_{o4}$ output ports.

The $i_{o3}$ output port of broadcast module 622 is connected to the $i_{i3}$ input port of broadcast module 626. The $i_{i3}$ output port of broadcast module 626 is linked to the first input port 628 of switch 630. Switch 630 is in switching stage 632 of distribution network 604. The first input port 628 of switch 630 is connected to the third output port 634 of switch 630. The third output port 634 of switch 630 is linked to the fourth input port 636 of switch 638. Switch 638 is in switching stage 640 of distribution network 604. The fourth input port 636 of switch 638 is connected to the second output port 642 of switch 638. The second output port 642 of switch 638 is interfaced to the receive port 644 of receive station j.

The $e_{o4}$ output port of broadcast module 622 is linked to the fourth input port 646 of switch 648. Switch 648 is in switching stage 632. The fourth input port 646 of switch 648 is connected to the first output port 650 of switch 648. The first output port 650 of switch 648 is linked to the third input port 652 of switch 654. Switch 654 is in switching stage 640. The third input port 652 of switch 654 is connected to the third output port 656 of switch 654. The third output port 656 of switch 654 is interfaced to the receive port 658 of receive station c.

The $e_{o1}$ output port of broadcast module 622 is linked to the first input port 660 of switch 648. The fourth output port 662 of switch 648 is linked to the third input port 664 of switch 666. Switch 666 is in switching stage 640. The third input port 664 of switch 666 is connected to the fourth output port 668 of switch 666. The fourth output port 668 of switch 666 is interfaced to the receive port 670 of receive station p.

The $i_{o1}$ output port of broadcast module 622 is linked to the $i_{i2}$ input port of broadcast module 672. Broadcast module 672 is in broadcast hyper-ring 624. Broadcast module 672 is in a state such that the $i_{i2}$ input port is connected to the $e_{o4}$ output port of broadcast module 672. The $e_{o4}$ output port of broadcast module 672 is linked to the fourth input port 674 of switch 676. Switch 676 is in switching stage 632. The fourth input port 674 of switch 676 is connected to the third output port 678 of switch 676. The third output port 678 of switch 676 is linked to the second input port 680 of switch 638. The second input port 680 of switch 638 is connected to the first output port 682 of switch 638. The first output port 682 of switch 638 is interfaced to the receive port 684 of receive station i.

The other connecting paths depicted in broadcast switching network 600, which allow the additional broadcast assignments therein to be realized, are not described. However, such connecting paths are similar to the connecting paths discussed for broadcast assignment (6→(c, i, j, p)), except that different broadcast modules and switches, or different input and output ports of the same broadcast modules and switches are utilized, as is apparent from FIG. 18.

Figure 19:
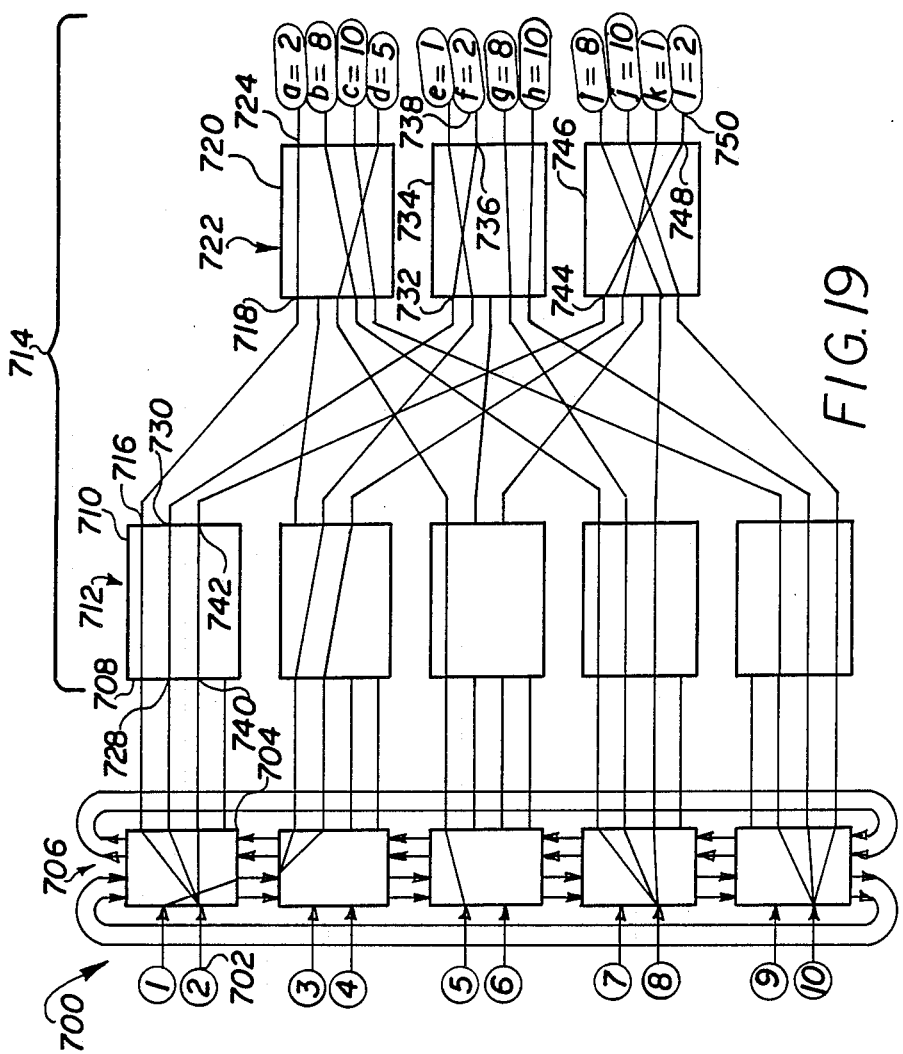
FIG. 19 is a schematic representation of a 10-input to 12-output broadcast switching network that does not have a presentation network realizing a broadcast assignment.

In FIG. 19 a 10-input to 12-output broadcast switching network 700 is shown realizing a broadcast assignment involving 5 of the 10 inputs. In this broadcast switching network 700 there is no presentation network. Again, the broadcast switching network 700 has unto itself sufficient connecting capability to broadcast and align the inputs to satisfy this request. Indeed, for the broadcast network of FIG. 19, all $12^{10}$ broadcast assignments are realizable.

Broadcast switching network 700 depicts broadcast assignments (1→(e, k)), (2→(a, f, l)), (5→(d)), (8→(b, g, i)), (10→(c. h. j)). In order, for instance, for broadcast assignment (2→(a, f, l)) to be realized, transmit port 702 of transmit station 2 is interfaced to the $e_{i2}$ input port of broadcast module 704. The $e_{i2}$ input port of broadcast module 704 is fanned-out to the $e_{o1}$, $e_{o2}$, and $e_{o3}$ output ports of broadcast module 704. Broadcast module. 704 is in broadcast ring 706. The $e_{o1}$ output port of broadcast module 704 is linked to the first input port 708 of switch 710 which in turn is connected to the first output port 716 of switch 710. The first output port 716 of switch 710 is linked to the first input port 718 of switch 720. Switch 720 is in switching stage 722 in distribution network 714. The first input port 718 of switch 720 is connected to the first output port 724 of switch 720. The first output port 724 of switch 720 is interfaced to the receive port 726 of receive station a.

The $e_{o2}$ output port of broadcast module 704 is linked to the second input port 728 switch 710. The second input port 728 of switch 710 is connected to the second output port 730 of switch 710. The second output port 730 of switch 710 is linked to the first input port 732 of switch 734. Switch 734 is in switching stage 722. The first input port 732 of switch 734 is connected to the second output port 736 of switch 734. The second output port 736 of switch 734 is interfaced to the receive port 738 of receive port F.

The $e_{o3}$ output port of broadcast module 704 is connected to the third input port 740 of switch 710. The third input port 740 of switch 710 is connected to the third output port 742 of switch 710. The third output port 742 of switch 710 is linked to the first input port 744 of switch 746. Switch 746 is in switching stage 722. The first input port 744 of switch 746 is connected to the fourth output port 748 of switch 746. The fourth output port 748 of switch 746 is interfaced to the receive port 750 of receive station l.

The other connecting paths depicted in broadcast switching network 700 which allow the additional broadcast assignments therein to be realized are not described. However, such connecting paths are similar to the connecting paths discussed for broadcast assignment (2→(a, f, l)), except that different broadcast modules and switches, or different input and output ports of the same broadcast modules and switches are utilized, as is apparent from FIG. 19.

It should be clear that many variations of the above broadcast switching network designs are possible. For example, a PB network could be designed in a manner similar to that discussed for the BD network. As another example, observe that in the examples given of PBD networks, the linkage pattern from the presentation network to the broadcast hub and from the broadcast hub to the distribution network is direct in the sense that the output ports of each switch module in the last stage of the presentation network are linked directly to the input ports of the corresponding broadcast module in the broadcast hub and, similarly, the output ports of each broadcast module in the broadcast hub are linked directly to the input ports of the corresponding switch module in first stage of the distribution network. An alternative would be to shuffle this linkage pattern. One possibility of such a shuffled linkage pattern would be to use the same pattern shown between each stage of the presentation and the distribution networks. As yet still another example of a variation of the broadcast switching network designs being considered, not only is there no reason why the number of input ports or the number of output ports should be equal in a broadcast switching network, but the number of inputs and outputs to the broadcast hub can also be different from each other and/or the number of network inputs and outputs. Indeed, having more broadcast hub inputs/outputs in comparison to network inputs/outputs can greatly facilitate broadcasting capability.

Finally, while previous discussion of the broadcast hubs have explicitly considered structures defined as vectors, rings, and hyper-rings, other structures, such as hyper-cubes, could also be used for broadcast hub structures.

Figure 20:
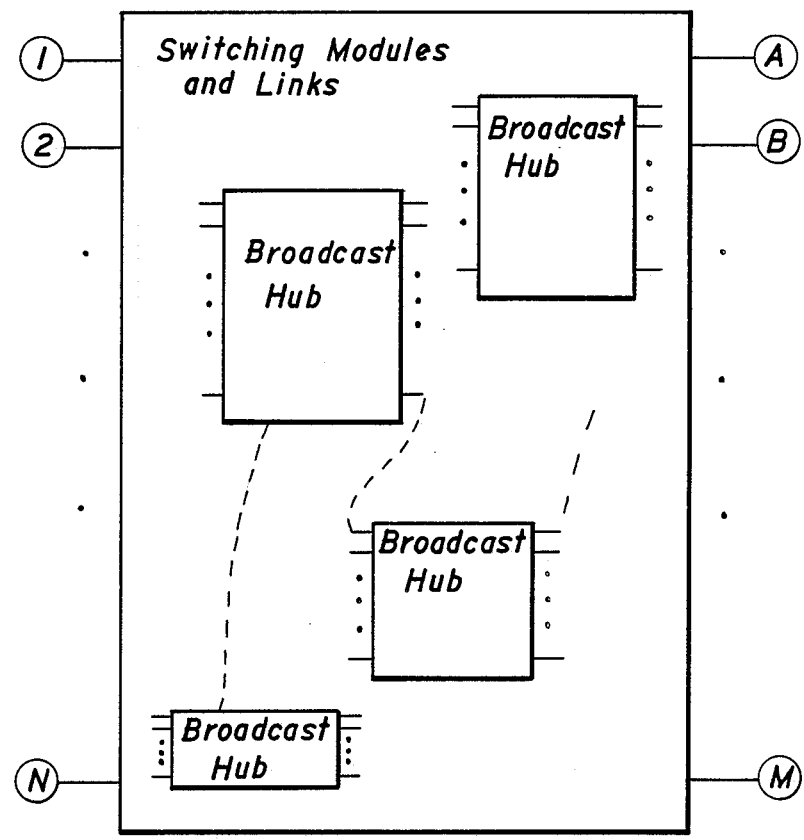
FIG. 20 is a schematic representation of broadcast hubs embedded in a broadcast switching network.

Many other designs are possible. FIG. 20 illustrates the general concept of embedding broadcast hubs into a switching structure. In such a general configuration, the notions of presentation and distribution are not explicitly apparent. Nevertheless, the underlying ideas supporting such general network designs are identical to that upon which the basic PBD network design is based.

The issue of establishing connecting paths through a broadcast switching network will now be discussed. Path set-up control of the broadcast switching structures being described here has two components which need to be tightly coordinated:

1. Setting up connecting paths through the switching modules.
2. Fan-out of these paths within the broadcast hubs.

Accordingly, to establish a broadcast connection from a specified broadcast network input to some specified set of broadcast network outputs, the availability and reachability of inputs/outputs of the switching modules and external/internal inputs/outputs of the broadcast hub must be taken into account. To facilitate a discussion of a control algorithm which does this, the basic PBD network of FIG. 15 will be considered. It should be understood that the algorithm could easily be modified to handle general variations of the basic PBD network design.

Clearly, the connecting capabilities of the presentation and distribution networks of FIG. 15 are central to the details of any broadcast network control algorithm. In general in a PBD network, if both the presentation and distribution networks are non-blocking in the sense that any connection from an idle input to an idle output within the presentation or distribution network can be established without disturbing any of the existing connections, then the overall broadcast network control algorithm can exploit this nonblocking switching capability relative to fan-out of the connecting paths within the broadcast hub. If, however, existing connecting paths in the presentation and distribution networks must at times be rearranged to establish a new broadcast connection or to add to a broadcast connection, then the overall broadcast network control algorithm must take into account these potential rearrangement requirements relative to the fan-out of the connecting paths within the broadcast hub. Finally, if the presentation and/or distribution networks cannot provide full connectivity between their inputs and outputs, then the broadcast network control algorithm must attempt to compensate for these limitations by means of the fan-out of connecting paths within the broadcast hub.

Thus, to give explicit details of a broadcast network control algorithm requires that the presentation and distribution network control components be explicitly described. In the following, an example of a broadcast network control algorithm will be given in which the issues of presentation and distribution network control are de-coupled from the issue of broadcast hub control. This is justified by the fact that whether the presentation or distribution networks are non-blocking or rearrangeable, algorithms for establishing connections through such presentation and distribution networks are well-known. (See C. Clos, "A Study of Nonblocking Switching Networks," *BSTJ*, vol. 32, no. 2 March, 1953, 406–424; V. Benes, *Mathematical Theory of Connecting Networks and Telephone Traffic* Academic Press, New York, 1965.) Accordingly, it will be assumed that the presentation network and distribution network control components of the overall broadcast network control algorithm can utilize these algorithms. Furthermore, if either the presentation network or distribution network involved in a broadcast network design does not have full accessibility between their respective inputs and outputs (for example, see FIGS. 18 and 19), then it will be assumed that this limited accessibility can in some way be characterized and this information will be made available to the broadcast network control algorithm for its use in determining connecting paths within the broadcast network to satisfy some broadcast assignment.

Figure 21:
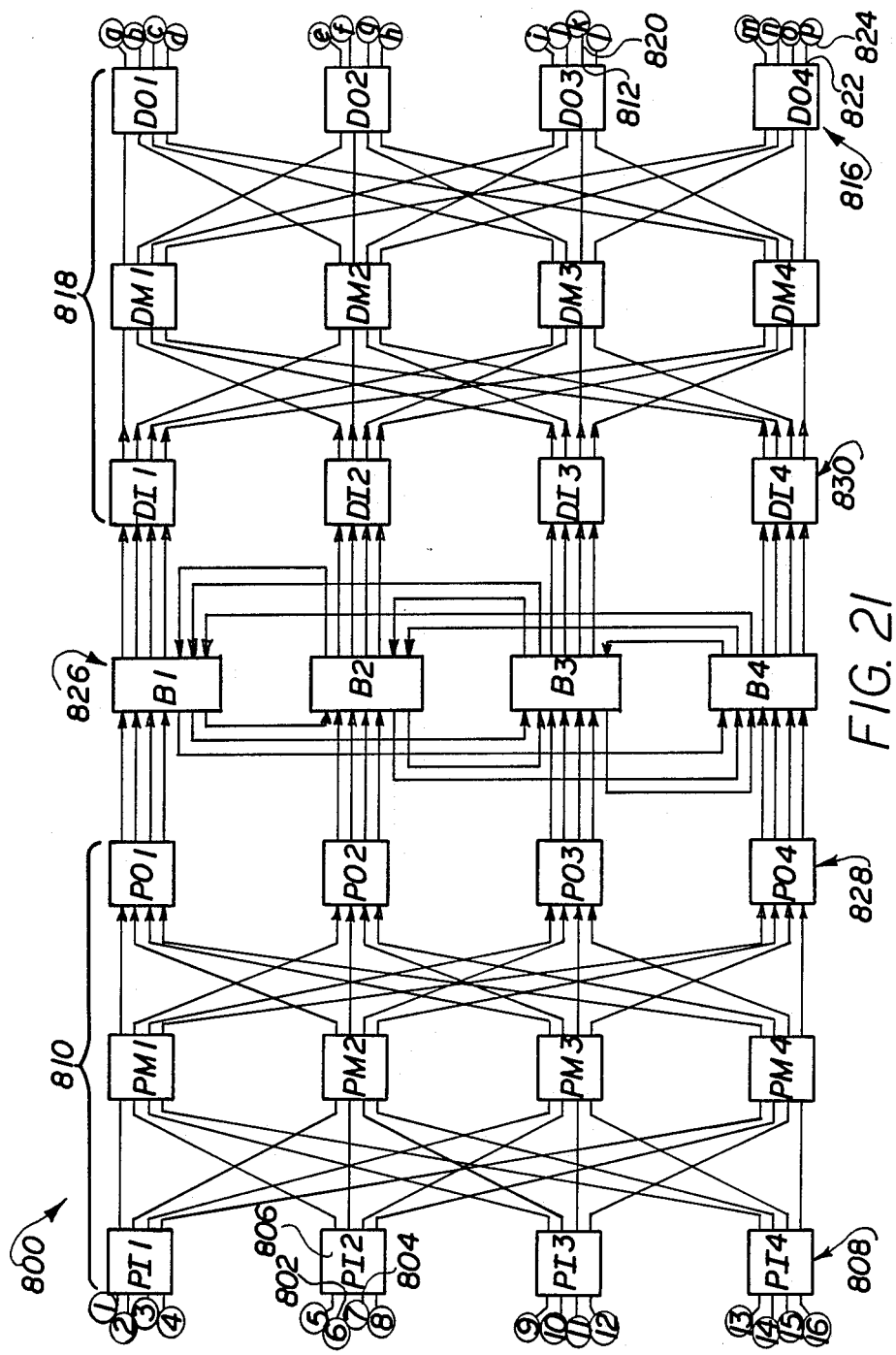
FIG. 21 is a schematic representation of a broadcast switching network to be used in illustrating the broadcast network control algorithm.

To describe a broadcast network control algorithm, the broadcast network shown in FIG. 21 will be considered. Suppose the broadcast connection to be realized is $(7 \rightarrow (k, p))$. In other words, input 7 of presentation input stage switch 2 (denoted (PI2)) is to be connected to some broadcast network output k of distribution output stage switch 3 (DO3) and output p of distribution output stage switch 4 (DO4).

Suppose further that at the time of the broadcast connection request, input 7 is not connected to any network outputs. This means that there is currently no connecting path from input 7 to the broadcast hyper-ring through the presentation network. Hence, to establish the broadcast connection $(7 \rightarrow (k, p))$, a connecting path must be provided through the network from input 7 to some idle presentation network output.

Figure 22:
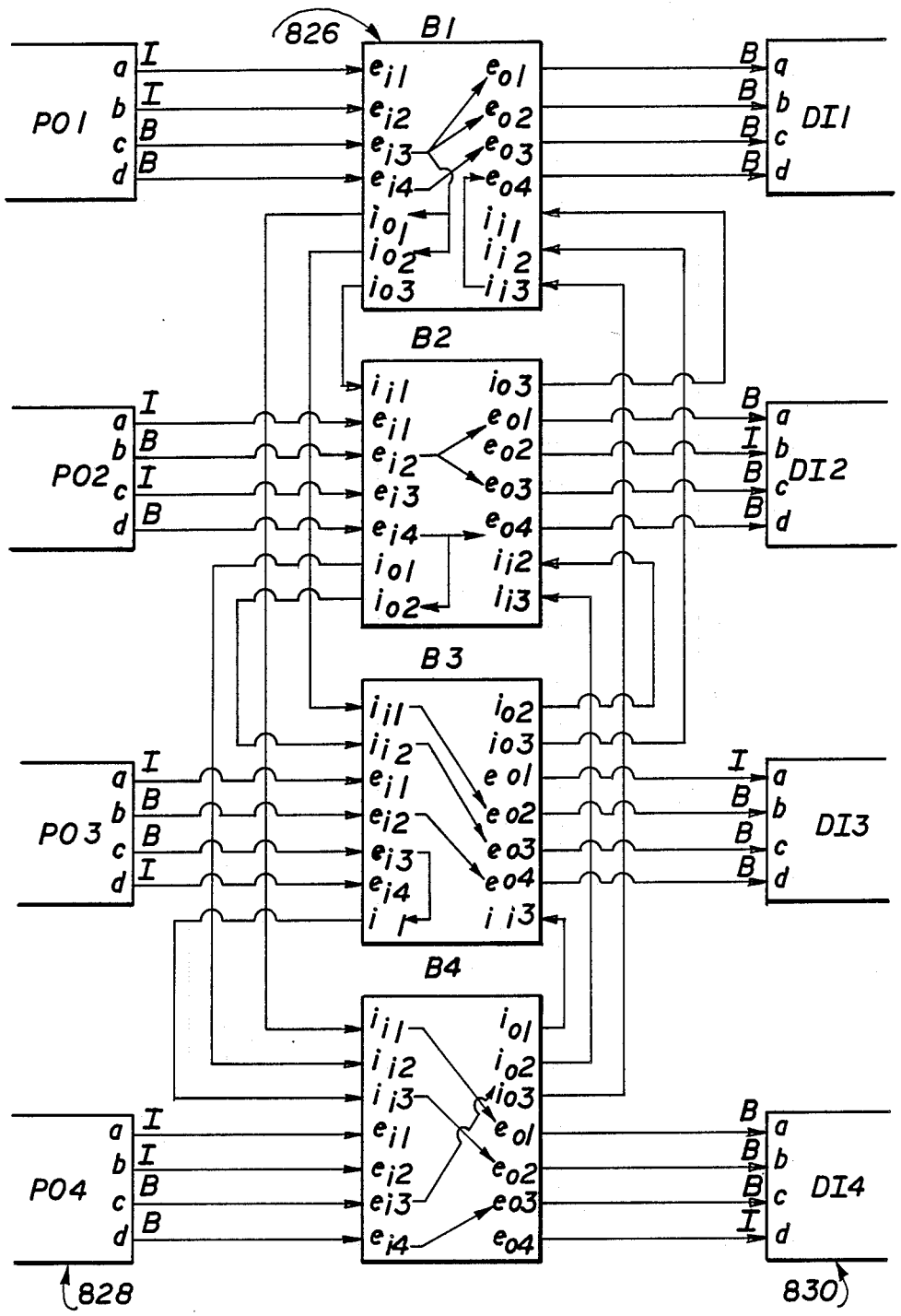
FIG. 22 is a schematic representation of the broadcast hyper-ring of FIG. 21 with associated presentation network outputs and distribution network inputs realizing a broadcast assignment.

Suppose at the time of this request, the state of the presentation network is such that the idle presentation network outputs are the following: outputs a and b of presentation output stage switch 1 (denoted as PO1($a$) and PO1($b$)); outputs a and c of presentation output stage switch 2 (PO2($a$) and PO2($c$)); outputs a and d of presentation output stage switch 3 (PO3($a$) and PO3($d$)); and outputs a and b of presentation output stage switch 4 (PO4($a$) and PO4($b$)). This is illustrated in FIG. 22 which is an expansion of the output stage of the presentation network, the broadcast hyper-ring, and the input stage of the distribution network of FIG. 21. The "B's" and "I's" in FIG. 22 correspond to busy and idle, respectively.

Similarly, at the time of this request, suppose that the state of the distribution network is such that the idle distribution network inputs are the following: input 2 of distribution input stage switch 2 (denoted as DI2(2)); input 1 of distribution input stage switch 3 (DI3(1)); and input 4 of distribution input stage switch 4 (DI4(4)). This is also illustrated in FIG. 22.

Clearly, the ability to fan-out a new connecting path through the broadcast hyper-ring depends in part on the nature of the fan-out currently implemented. Note in FIG. 22 that the connecting path presented to the broadcast hyper-ring by PO1($c$) is being fanned-out to four broadcast hyper-ring external outputs: B1($e_{o1}$), B1($e_{o2}$), B3($e_{o2}$), and B4($e_{o1}$). Because this fan-out utilizes different broadcast modules, both the fan-out and the corresponding broadcast connection are said to be distributed. Because this fan-out does not utilize sequential inputs of the distribution network, both the fan-out and the broadcast connection are said to be non-sequential. Ideally, all fan-outs in the broadcast connection would be non-distributed and sequential. However growth and termination of other broadcast connections might prevent this from being achievable. For example, implementing a non-distributed sequential broadcast connection over the broadcast hyper-ring might require extensive or prohibitive rearrangement in the presentation and/or distribution networks. Or, as another example, implementing a non-distributed sequential broadcast connection over the broadcast hyper-ring might be impossible because of the limited connecting capability of the presentation and/or distribution networks.

Even assuming full reachability of input 7 to all the presentation network output stage switches, it should be clear from observing FIG. 22 that it is not possible to provide the broadcast connection from input 7 of P14 to output k of DO3 and output p of DO4 by using either a non-distributed or a sequential fan-out. Accordingly, to add (7→(k, p)) to the broadcast connections being realized without disturbing any of these connections, the broadcast network control algorithm must fan-out the connecting paths over multiple broadcast modules in the broadcast hyper-ring. To accomplish this, the reachability and availability of external and internal inputs and outputs of each broadcast module must be known relative to input 7 and outputs k and p:

A presentation network output switch availability list will be defined to be a list of the output switches of the presentation network that currently have idle links into broadcast modules. This list will be denoted as POAV. For FIG. 22,

POAV=(PO1, PO2, PO3, PO4)

A presentation network output switch reachability list will be defined relative to the broadcast network input that is to be connected to the broadcast network outputs according to some requested broadcast connection. For our broadcast connection example of (7→(k, p)), this list will be denoted as POR$_7$. A presentation network output switch reachability list corresponds to the set of output switches of the presentation network to which an input (input 7 in the broadcast connection example of (7→(k, p))) has access given the current state of the presentation network and/or the operational restrictions under which connecting paths must be established through it. Ideally, POR$_7$ ⊇ POAV. This would mean that input 7 could be connected to each presentation network output switch with an idle link to a broadcast module. This, of course, would be the case if the presentation network were non-blocking, or if the presentation network were rearrangeable and there were no limits on the extent to which rearrangements could take place. However, in general, POR$_7$ ⊉ POAV and the broadcast network control algorithm must utilize POR$_7$ ∩ POAV.

Similarly, a distribution network input switch availability list will be defined to be a list of the input switches of the distribution network that have idle links from the broadcast modules. This list will be denoted as DIAV. For FIG. 22,

DIAV=(DI2, DI3, DI4)

Distribution network output switch reachability lists will be defined relative to each of the broadcast network outputs that is to be connected to the broadcasting input according to some requested broadcast connection. For our broadcast connection example of (7→(k, p)), these lists will be denoted as DIR$_k$ and DIR$_p$. Distribution network output switch reachability lists correspond to the input switches of the distribution network to which each of the outputs (k and p in the broadcast connection example of (7→(k, p))) have access given the current state of the distribution network and/or the operational restrictions under which connecting paths can be established through it. In general, DIR$_k$ ⊉ DIAV and DIR$_p$ ⊉ DIAV and the broadcast network control algorithm must utilize DIR$_k$ ∩ DIAV and DIR$_p$ ∩ DIAV.

To realize the broadcast connection (7→(k, p)), the broadcast network control algorithm must fan-out one of the presentation network connecting paths available to the broadcast hyper-ring from one of the output switches in POR$_7$ ∩ POAV into two connecting paths within the broadcast ring and then connect one of these fanned-out paths to a distribution network input switch in DIR$_k$ ∩ DIAV and connect the other fanned-out path to a distribution network input switch in DIR$_p$ ∩ DIAV. To do this, the available connectivity of each of the broadcast modules in the broadcast hyper-ring to the output switches of the presentation network, to the input switches of the distribution network, and to other broadcast modules must be considered. For each broadcast module, a broadcast module connectivity list will denote the set of output switches of the presentation network, input switches of the distribution network, and other broadcast modules to which that broadcast module can currently be directly connected. If there are broadcast modules, the broadcast module connectivity lists will be denoted BM1, BM2, . . . , BMm, where BMi corresponds to broadcast module i. In FIG. 9,

BM1=(PO1, PO2, B2)

BM2=(PO2, PO2, DI2, B1, B4)

BM3=(PO3, DI3, B1, B2)

BM4=(PO4, PO4, DI4, B2, B3)

Note that PO1 is listed twice in BM1. This because there are two idle links from PO1 into BM1. For the same reason there are multiple listings of PO2 in BM2, PO3, in BM3, and PO4 in BM4. Similarly, if BMi had t idle links into DIi, then would be listed t times in BMi. Finally, the fact that in this example BMi's only list POi's and DIi's (in addition to the Bj's) is only a result of the direct linkage patterns between broadcast hyper-ring and the output switch stage of the presentation network and the input switch stage of the distribution network.

The following algorithm formally characterizes the above discussion in a general context:

General Control Algorithm

1. Given a requested broadcast connection (x→(a,b, . . . , c)), determine the following sets:

$\Delta_x$=POR$_x$ ∩ POAV $\theta_a$=DIR$_a$ ∩ DIAV, $\theta_b$=DIR$_b$ ∩ DIAV, . . . , $\theta_c$=DIR$_c$ ∩ DIAV If $\Delta_x$=POR$_x$ ∩ POAV=Φ, or if $\theta_i$=Φ for i ϵ(a,b, . . . c), go to step 13, otherwise, proceed to step 2.

Comment: The presentation network output switches that are reachable from input x by means of compatible connecting paths relative to existing connections and have idle links into broadcast modules are determined in this step and denoted by the set $\Delta_x$. If $\Delta_x$ is empty, then given the current set of connecting paths through the presentation network and the operational restrictions under which the connecting paths can be established, input x cannot reach the broadcast hub. The distribution network input switches that have idle links from broadcast modules and are reachable from each of the outputs a,b, . . . , c by means of compatible connecting paths relative to existing connections and the operational restrictions under which the connecting paths can be established are also established in this step and are denoted, respectively, as $\theta_a$, $\theta_b$, . . . $\theta_c$. If any $\theta_i$ is empty, then given the current set of connecting paths through the distribution network and the operational restrictions under which the connecting paths can be established, output i cannot be reached from the broadcast hub. Finally, it should be noted here that a non-empty $\theta_i$ means that there are connecting paths from the input stage of the distribution network to output i that are compatible with existing paths. However, paths corresponding to a $\theta_i$ and paths corresponding to a $\theta_j$ might not be compatible with each other. The algorithm will deal with this issue in step 9.

2. Determine BM1, BM2, . . . , BMm.

Comment: The broadcast module connectivity lists denoting the set of output switches of the presentation network, input switches of the distribution network, and other broadcast modules to which each broadcast module can currently be directly connected are established in this step.

3. Choose an element, say, $POi\epsilon\Delta_x$. If $\Delta_x=\Phi$, go to step 13.

Comment: A presentation network output switch, POi, is selected which has idle links into the broadcast hub and which can be reached from input x with a compatible connecting path.

4. Let $\Sigma$ be the set of all the Bk's for which POi$\epsilon$BMk.

Comment: In this step, all the broadcast modules which can be reached from POi are determined as the set $\Sigma$.

5. If $\Sigma=\Phi$, set $\Delta_x=\Delta_x-POi$ and go to step 3. If $\Sigma\neq\Phi$, choose an element, say, Bk$\epsilon\Sigma$ and let $\Gamma=\{BMk\}$.

Comment: If no broadcast modules can be reached from the selected POi (i.e., $\Sigma=\Phi$), then another presentation network output switch POj$\neq$POi, POj$\epsilon\Delta_x$ must be selected in step 3. Otherwise, some Bk$\epsilon\Sigma$ is chosen as the broadcast module to which POi will be connected. $\Gamma$ is initially defined as the broadcast module connectivity list for Bk. The set $\Gamma$ will contain among its elements other broadcast modules which can be reached directly from Bk and input switches of the distribution network that can also be reached directly from Bk.

6. Let $\Lambda$ be the union of all BMj for which Bj$\epsilon\Gamma$ and also for which BMj $\not\subset \Gamma$ $$\Lambda = \{\cap BMj | Bj\epsilon\Gamma \text{ and } BMj \not\subset \Gamma\}$$

Comment: Additional broadcast modules and/or distribution network input switches that can be reached by input x through broadcast modules to which Bk has idle links are determined in the initial execution of this step. Subsequent iterations of this step will determine broadcast modules and/or distribution network input switches that can be reached by input x indirectly through other broadcast modules.

7. Let $\Gamma=\Gamma\cup\Lambda$. If $\Lambda=\Phi$, go to step 7; if $\Lambda\neq\Phi$, go to step 6.

Comment: $\Gamma$ is updated in this step by including in it all the elements of $\Lambda$ determined in step 6. If the $\Lambda$ determined in the most recent iteration of step 6 was empty, then the current $\Gamma$ contains among its elements all of the broadcast modules and/or distribution network input switches that can be reached by input x through the selected POi, and step 7 should now be performed. If the $\Lambda$ determined in the most recent iteration of step 6 was not empty, then step 6 must be executed again for there is the possibility that broadcast modules and/or distribution network input switches in addition to those currently included in $\Gamma$ can be reached by input x through POi.

8. Let $\Omega_x=(a, b, \ldots, c)$ denote the output set in the broadcast connection $(x\rightarrow(a, b, \ldots, c)$ 9. Choose an output $s\epsilon\Omega_x$. Select a $DI_q\epsilon\Gamma$ for which $DI_q\epsilon\theta_s=DIR_s\cap DIAV$, and for which there is an compatible connecting path through the distribution network from $DI_q$ to output s relative to all other connecting paths that have been previously selected in iterations of this step for the partial realization of $(x\rightarrow(a,b, \ldots, c))$. If such a $DI_q$ can be found, set $\Gamma=\Gamma DI_q$ and go to step 10; if no such $DI_q$ can be found, go to step 11.

Comment: In this step, an attempt is made to determine a connecting path from input x to output s via $DI_q$ for the partial realization of $(x\rightarrow(a,b, \ldots, c))$. This path can be denoted as $(x\rightarrow POi\rightarrow DI_q\rightarrow s)$. By the construction of $\Gamma$, it is known that input x can reach $DI_q\epsilon\Gamma$ through the broadcast hub. However, it must be determined whether a compatible path exists from $DI_q$ to output s relative to other connecting paths through the distribution network determined in previous executions of this step of the algorithm for partially realizing $(x\rightarrow(a, b, \ldots, c))$. For example, suppose that in previous iterations of this step, compatible paths through the distribution network have been determined for $(s_1,s_2, \ldots, s_k) \subset (a,b, \ldots, c))$. Suppose further that in the current iteration of this step of the algorithm no $DI_q\epsilon\Gamma$ could be found for which a path corresponding to $DI_q\rightarrow s$ existed which was compatible with all of the paths through the distribution network determined for $(s_1, s_2, \ldots, s_k) \subset (a,b, \ldots, c)$ corresponding to $(DIr\rightarrow s)$. In such a case, alternative paths through the distribution network for some subset of the $(s_1, s_2, \ldots, s_k) \subset (a,b, \ldots, c)$ would be sought in step 11. Otherwise, the algorithm deletes a single listing of $DI_q$ from F and proceeds to step 10 where output s is deleted from $\Omega_x$ and it is determined whether the complete broadcast connection $(x\rightarrow(a,b, \ldots, c))$ can now be realized or whether only part of this connection has been addressed and further iterations of step 9 are required. Finally, it should be clear that in the initial execution of this step, since $DI_q\epsilon\theta_s=DIR_s\cdot DIAV$, no conflict with existing connecting paths through the distribution network can occur.

10. Set $\Omega_x=\Omega_x-s$. If $\Omega_x=\emptyset$, go to step 12; otherwise, go to step 9.

Comment: If after s is removed from $\Omega_x$, the result is that $\Omega_x$ is empty, then connecting paths through the broadcast hub and the distribution network have been determined for the complete realization of $(x\rightarrow(a,b, \ldots, c))$ and the algorithm stops. If after s is removed from $\Omega_x$, the result is that $\Omega_x$ is not empty, then a realization of $(x\rightarrow(a,b, \ldots, c))$ has only been partially determined, and the algorithm returns to step 9 to consider the remaining part of $(x\rightarrow(a,b, \ldots, c))$.

11. Let $(s_1,s_2, \ldots, s_k) \subset (a,b, \ldots, c)$ denote the subset of outputs to which compatible paths through the distribution network have thus far been determined.

Let the elements of the set $(P^1_{si}, \ldots, P^{ri}_{si})$ denote all the paths through the distribution network to output $s_i$ $\epsilon(s_1,s_2, \ldots, s_k)$ which are compatible with the existing paths through the distribution network (not considering previously determined paths to other outputs in $(s_1,s_2, \ldots, s_k) \subset (a,b, \ldots, c))$. Similarly, let the elements of the set $(P^1_s, \ldots P^r_s)$ denote all the paths through the distribution network to output s which are compatible with the existing paths through the distribution network (not considering previously determined paths to outputs in $(s_1,s_2, \ldots, s_k) \subset (a,b, \ldots, c))$. Let $P_{si} \epsilon(P^1_{si}, \ldots, P^{ri}_{si})$ denote the path through the distribution network to output $s_i \in (s_1, s_2, \ldots, s_k)$ selected for use in the realization of $(x \rightarrow (a, b, \ldots, c))$ in a previous iteration of this algorithm.

Attempt to select one path from each of the sets of paths, $(P^1_{s1}, \ldots, P^{r_1}_{s1})$, $(P^1_{s2}, \ldots, P^{r_2}_{s2}), \ldots, (P^1_{sk}, \ldots, P^{r_k}_{sk})$, and $(P^1_s, \ldots, P^r_s)$ such that the resulting set of paths is mutually compatible.

If such a selection of paths can be found, it represents a new set of connecting paths through the distribution network connecting input x to outputs $(s_1, s_2, \ldots, s_k, s) \subseteq (a, b, \ldots, c)$. Go to step 10 after updating $\Gamma$ by first adding into it, for each $s_i \in (s_1, s_2, \ldots, s_k) \subseteq (a, b, \ldots, c))$, each $DI_q$ used in a $P_{si}$ that had been previously determined as the connecting path through the distribution network to the output $s_i$ and then deleting the $DI_r$ used in the newly selected connecting path through the distribution network to the output $s_i$.

If no such selection of paths can be found, let $\Sigma = \Sigma - B_k$ and go to step 5.

Comment: This step is reached if, using a path in the presentation network from input x through POi and into the broadcast hub through Bk, no $DI_q \in \Gamma$ can be found for which there is a compatible connecting path through the distribution network to output s relative to all other connecting paths that have been previously determined in iterations of the algorithm for the partial realization of $(x \rightarrow (a, b, \ldots, c))$. $(s_1, s_2, \ldots, s_k) \subset (a, b, \ldots, c)$ denotes the subset of outputs to which compatible paths through the distribution network have thus far been determined. The paths to each si $(s_1, s_2, \ldots, s_k)$ must be reconsidered to determine if alternative paths compatible with a path to output s can be found. If no such set of mutually compatible paths can be found, then either a new $B_i \neq B_k$, $B_i \in \Sigma$ must be selected as the broadcast module to which POi is connected or a new $POj \neq POi$, $POj \in \Delta_x$ must be considered for the path from input x into the broadcast hub. If no such Bi or POj is available, a complete realization of $(x \rightarrow (a, b, \ldots, c))$ is not possible given the current set of connecting paths through the presentation and/or distribution network and the operational restrictions under which connecting paths can be established.

12. STOP. A complete realization of $(x \rightarrow (a, b, \ldots, c))$ has been determined.

13. STOP. A complete realization of $(x \rightarrow (a, b, \ldots, c))$ is not possible given the current set of connecting paths through the presentation and/or distribution network and the operational restrictions under which connecting paths can be established.

In the example of $(7 \rightarrow (k, p))$ for the sake of simplicity, assume that $POR_7 \cap POAV = POAV$, $DIR_k \cap DIAV = DIAV$, and $DIR_p \cap DIAV = DIAV$. Then the control algorithm would execute as follows.

1. Given the requested broadcast connection $(7 \rightarrow (k, p))$, $\Delta_7 = (PO1, PO2, PO3, PO4)$ $\theta_k = (DI2, DI3, DI4)$ and $\theta_p = (DI2, DI3, DI4)$

2.

BM1 = (PO1, PO1, B2)

BM2 = (PO2, PO2, DI2, B1, B4)

BM3 = (PO3, DI3, B1, B2)

BM4 = (PO4, PO4, DI4, B2, B3)

3. Choose $PO2 \in \Delta_7$.

4.

$\Sigma = (B2)$

5. Choose $B2 \in \Sigma$ $\Gamma = BM2 = (PO2, PO2, DI2, B1, B4)$

6.

$\Lambda = BM4 = (PO1, PO1, B2, PO4, PO4, DI4, B2, B3)$

7.

$\Gamma = \Gamma \cup \Lambda = (PO2, PO2, DI2, B1, B4, PO1, PO1, B2, PO4, PO4, DI4, B2, B3)$

6.

$\Lambda = BM3 = (PO3, DI3, B1, B2)$

7.

$\Gamma = \Gamma \cup \Lambda = (PO2, PO2, DI2, B1, B4, PO1, PO1, B2, PO4, PO4, DI4, B2, B3, PO3, DI3, B1, B2)$

6.

$\Lambda = \emptyset$

8. $\Omega_7 = (k, p)$

9. Choose output $k \in \Omega_7$. Select $DI2 \in \Gamma$ where $DI2 \in \theta_k = (DI2, DI3, DI4)$. There is a compatible connecting path through the distribution network from DI2 to output k.

$\Gamma = \Gamma - DI2 = (PO2, PO2, B1, B4, PO1, PO1, B2, PO4, PO4, DI4, B2, B3, PO3, DI3, B1, B2)$ 10. $\Omega_7 = \Omega_7 - k = (p)$.

9. Choose output $p \in \Omega_7$. Select $DI4 \in \Gamma$ where $DI4 \in \theta_p = (DI2, DI3, DI4)$ There is a compatible connecting path through the distribution network from DI4. $\Gamma = \Gamma - DI4 = (PO2, PO2, DI2, B1, B4, PO1, PO1, B2, PO4, PO4, B2, B3, PO3, DI3, B1, B2)$ 10. $\Omega_7 = \Omega_7 - p = \emptyset$.

12. STOP. A complete realization of $(7 \rightarrow (k, p))$ has been determined. It consists of the connecting paths $(7 \rightarrow PO2 \rightarrow B2 \rightarrow DI2 \rightarrow k)$ and $(7 \rightarrow PO2 \rightarrow B2 \rightarrow B4 \rightarrow DI4 \rightarrow p)$.

Figure 23:
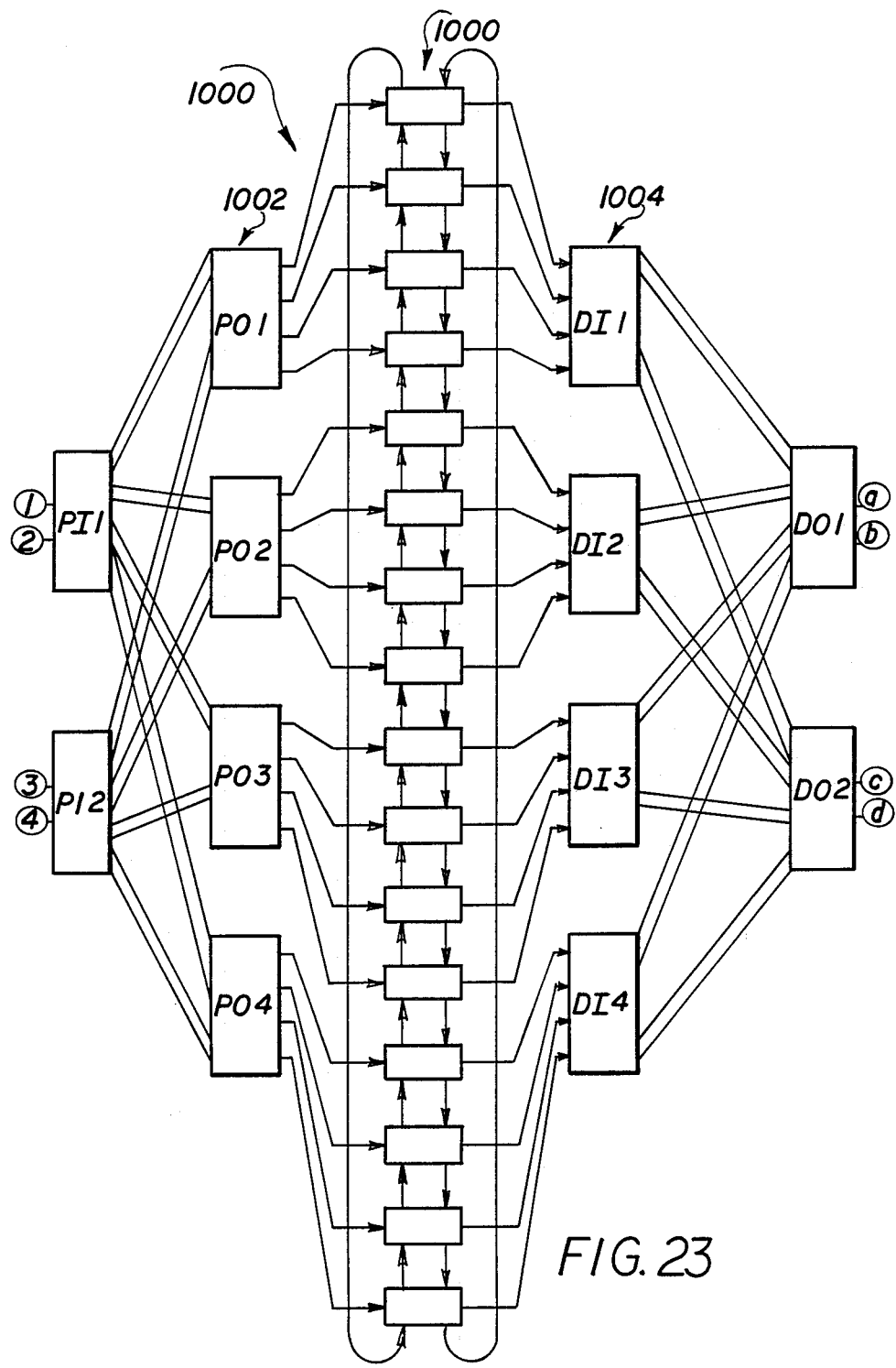
FIG. 23 is a schematic representation of a 4 input, 4 output switching network with a broadcast ring of 16 broadcast modules.

In general, depending on the connecting capabilities of the presentation and distribution network, and the structure and link threading of the broadcast modules in the broadcast hub, all broadcast assignment might not be realizable in a given network. However, if all broadcast assignments are realizable in a given broadcast network, then for any requested broadcast connection the network control algorithm specified above will always result in a complete realization. FIG. 23 shows a broadcast network 1000 utilizing a broadcast ring 1001 for which all broadcast assignments are realizable and for which the control algorithm always produces a complete realization for any requested broadcast assignment. Given any set of connecting paths implemented in the presentation network 1002 and distribution network 1004, the control algorithm can realize a new broadcast assignment or add to an existing broadcast assignment without any disturbance of the currently implemented paths. This illustrates that the network control algorithm fully utilizes the connecting capability of the broadcast network structure.

The above algorithm has been described from the perspective of realizing an entirely new broadcast assignment in the network. That is, the requested broadcast connection (x→(a,b, . . . c)) is such that input x is assumed to be not connected to any outputs before this broadcast connection is requested. If instead the request was to add an output to an already existing connection in the network, the algorithm could still be used and would operate similarly. For example, suppose (x→(a,b, . . . c)) existed and output d, d ϵ (a,b, . . . c), requested to join this broadcast connection. Since a connecting path from input x to the broadcast hub has already been established through some POi, Γ would be determined for this POi. Similarly, $\theta_a$, $\theta_b$, . . . $\theta_c$ and $\theta_d$ would be determined. The algorithm would then proceed as though the currently existing connecting paths for outputs a,b, . . . c represented a partial realization of (x→(a,b, . . . c,d)).

A broadcast module can be constructed by using N:1 multiplexers which permit a single output to be connected to any one of the N inputs as controlled by $\log_2 N$ control lines. The setting of the connections can be stored in buffers that connect directly to the multiplexers. These buffers are loaded from a serial control line through a 1:N de-multiplexer which permits a single input line to be connected to any one of N outputs as controlled by $\log_2 N$ control lines.

Figure 24:
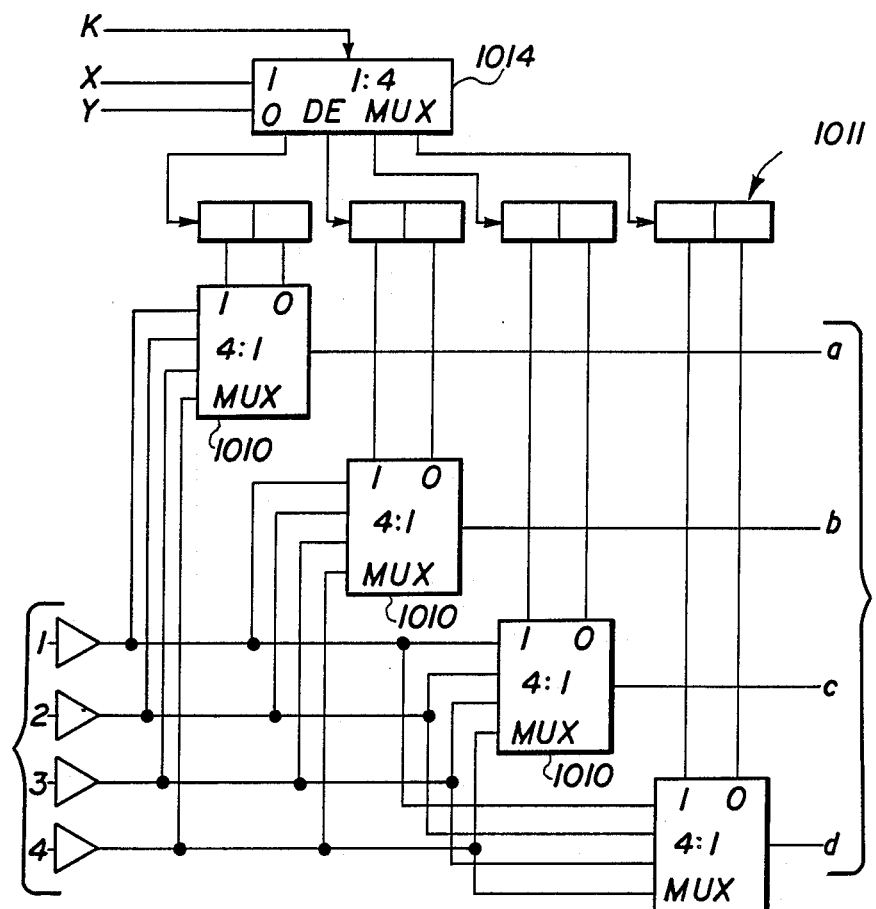
FIG. 24 is a schematic representation of an implementation of a broadcast module.

FIG. 24 depicts such a broadcast module with 4 inputs (denoted 1, 2, 3, and 4) and 4 outputs (denoted a, b, c, and d). Each multiplexer has 4 inputs, 1 output and 2 control lines (denoted 1 and 0). The control information for each multiplexer 1010 is stored in a 2 bit buffer 1011. The buffer 1011 is loaded from line k through a 1:4 de-multiplexer 1014. The de-muliplexer has 1 input, 4 outputs, and 2 control lines (denoted 1 and 0). Clock lines are not shown in FIG. 24, but it should be understood that the control signal k is loaded into the appropriate buffer 1011 synchronized with a clock signal. The buffer 1011 which is loaded is determined by the signals on X and Y. When the 2 bit buffers 1011 are loaded, the connections from (1,2,3,4) to (a,b,c,d) are established. Clearly, broadcasting one input to more than one output can be accomplished by simply loading the 2 bit buffers 1011 controlling the multiplexers 1010 associated with those outputs, with the 2 bit binary number associated with broadcasting the input.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A broadcast network comprising:
N transmit stations, each transmit station being capable of transmitting a signal and N being an integer $\geq 1$;
M receive stations, where M is an integer $\geq 2$;
I switching stages where I is an integer $\geq 0$; and
a broadcast hub, said broadcast hub and I switching stages connected such that they are capable of linking the N transmit stations to the M receive stations so that any one of the N transmit stations can transmit a signal to L of the receive stations, where L is an integer and $2 \geq L \geq M$, but each receive station can receive a signal from only one of the N transmit stations at any given time, said broadcast hub and switching stages linking more than one of the N transmit stations to desired receive stations at any given time.

2. A broadcast network as described in claim 1 wherein the broadcast hub is a broadcast vector.

3. A broadcast network as described in claim 2 wherein there is at least one switching stage which forms a presentation network linking the N transmit stations to the broadcast vector.

4. A broadcast network as described in claim 3 wherein there is at least one additional switching stage which forms a distribution network linking the broadcast vector to the M receive stations.

5. A broadcast network as described in claim 2 wherein the broadcast vector is comprised of P broadcast modules, where $P \geq 2$ and is an integer, each broadcast module having $e_{iq}$ external inputs and $e_{or}$ external outputs, and $i_{is}$ internal inputs and $i_{ot}$ internal inputs, where $e_{iq}$, $e_{or}$, $i_{is}$ and $i_{ot} \geq 1$ and are integers, with at least one of the internal outputs of one of the N broadcast modules being linked to an internal input of another broadcast module and each broadcast module having means for connecting an input port of the $e_{iq}$ and $i_{is}$ input ports to Q of the $e_{or}$ and $i_{ot}$ output ports, where Q is an integer and $1 \leq Q \leq e_{or} + i_{ot}$, and each output port is only connected to one input port but more than one output port can be connected to an input port.

6. A broadcast network as described in claim 5 wherein there is at least one switching stage which forms a presentation network linking the N transmit stations to the broadcast vector.

7. A broadcast network as described in claim 6 wherein there is at least one additional switching stage which forms a distribution network linking the broadcast vector to the M receive stations.

8. A broadcast network as described in claim 1 wherein the broadcast hub is a broadcast ring.

9. A broadcast network as described in claim 8 wherein there is at least one switching stage which forms a presentation network linking the N transmit stations to the broadcast ring.

10. A broadcast network as described in claim 9 wherein there is at least one additional switching stage which forms a distribution network linking the broadcast ring to the M receive stations.

11. A broadcast network as described in claim 10 wherein there is at least one additional switching stage which forms a distribution network linking the broadcast hyper-ring to the M receive stations.

12. A broadcast network as described in claim 8 wherein the broadcast ring is comprised of P broadcast modules where $P \geq 2$ and is an integer, each broadcast module having $e_{iq}$ external inputs, and $e_{or}$ external outputs, and $i_{is}$ internal inputs and $i_{ot}$ internal outputs, where $e_{iq}$, $e_{or}$, $i_{is}$ and $i_{ot} \geq 1$ and are integers, said external inputs and outputs providing for signals into and out of the broadcast ring, respectively but not to other broadcast modules in the broadcast ring, said internal inputs and outputs providing for signal flow between the broadcast modules in the broadcast ring with at least one of the $i_{ot}$ internal outputs of the broadcast module being linked to at least one of the $i_{is}$ internal inputs of another broadcast module, and every broadcast module in the broadcast ring having an internal output of another broadcast module linked to one of its $i_{is}$ internal inputs and each broadcast module having means for connecting an input port of the $e_{iq}$ and $i_{is}$ input ports to Q of the $e_{or}$ and $i_{ot}$ output ports, where Q is an integer and $1 \leq Q \leq e_{or} + i_{ot}$, and each output port is only connected to one input port but more than one output port can be connected to an input port.

13. A broadcast network as described in claim 12 wherein there is at least one switching stage which forms a presentation network linking the N transmit stations to the broadcast ring.

14. A broadcast network as described in claim 13 wherein there is at least one additional switching stage which forms a distribution network linking the broadcast ring to the M receive stations.

15. A broadcast network as described in claim 1 wherein the broadcast hub is a broadcast hyper-ring.

16. A broadcast network as described in claim 15 wherein there is at least one switching stage which forms a presentation network linking the N transmit stations to the broadcast hyper-ring.

17. A broadcast network as described in claim 15 wherein the broadcast hyper-ring is comprised of P broadcast modules where $P \geq 3$ and is an integer, each broadcast module having $e_{ig}$ external inputs, and $e_{or}$ external outputs, and $i_{is}$ internal inputs and $i_{ot}$ internal outputs, where $e_{ig}$, $e_{or}$, $i_{is}$ and $i_{ot} \geq 1$ and are integers, with at least one of the outputs of one of the P broadcast modules being linked to at least one of the inputs of at least 2 of the P-1 other broadcast modules, and every broadcast module in the broadcast hyper-ring having an output of another broadcast modules linked to one of its inputs; each broadcast module having means for connecting an input port of the $e_{iq}$ and $i_{is}$ input ports to Q of the $e_{or}$ and $i_{ot}$ output ports, where Q is an integer and $1 \leq Q \leq e_{or} + i_{ot}$, and each output port is only connected to one input port but more than one output port can be connected to an input port; and J switches, where $J \geq 0$, said broadcast modules and switches are linked such that a signal that is inputted into the broadcast hyper-ring at one of the $e_{iq}$ input ports can be outputted out of the broadcast hyper-ring at L of the $e_{or}$ output ports, where L is an integer and $2 \leq L \leq e_{or}$, but each output port can only output the signal inputted into the broadcast hyper-ring from one external input port at any given time, said broadcast modules and switching stages capable of directing the signals from more than one of the $e_{iq}$ input ports to desired output ports at any given time.

18. A broadcast hyper-ring described in claim 17 wherein at least one of the $i_{ot}$ internal outputs of one of the P broadcast modules is linked to at least one of the $i_{is}$ internal inputs of at least 2 of the P-1 other broadcast modules, and every broadcast module in the broadcast hyper-ring having an internal output of another broadcast module linked to one of its $i_{is}$ internal inputs.

19. A broadcast network as described in claim 18 wherein there is at least one switching stage which forms a presentation network linking the N transmit stations to the broadcast hyper-ring.

20. A broadcast network as described in claim 19 wherein there is at least one additional switching stage which forms a distribution network linking the broadcast hyper-ring to the M receive stations.

21. A broadcast vector comprising:

P broadcast modules, where $P \geq 2$ and is an integer, each broadcast module having $e_{iq}$ external inputs and $e_{or}$ external outputs, and $i_{is}$ internal inputs and $i_{ot}$ internal outputs, where $e_{iq}$, $e_{or}$, $i_{is}$ and $i_{ot} \geq 1$ and are integers, with at least one of the internal outputs of one of the P broadcast modules being linked to an internal input of another broadcast module and each broadcast module having means for connecting an input port of the $e_{iq}$ and $i_{is}$ input ports to Q of the $e_{or}$ and $i_{ot}$ output ports, where Q is an integer and $1 \geq Q \geq e_{or} + i_{ot}$, and each output port is only connected to one input port but more than one output port can be connected to an input port; and wherein a presentation network is connected to the P broadcast modules to provide signals thereto.

22. A broadcast vector as described in claim 21 including a distribution network connected to the P broadcast modules to remove signals therefrom.

23. A broadcast ring comprising:

P broadcast modules where $P \geq 2$ and is an integer, each broadcast module having $e_{iq}$ external inputs, and $e_{or}$ external outputs, and $i_{is}$ internal inputs and $i_{ot}$ internal outputs, where $e_{iq}$, $e_{or}$, $i_{is}$ and $i_{ot} \geq 1$ and are integers, said external inputs and outputs providing for signals into and out of the broadcast ring, respectively but not to other broadcast modules in the broadcast ring, said internal inputs and outputs providing for signal flow between the broadcast modules in the broadcast ring, with at least one of the $i_{ot}$ internal outputs of the broadcast module being linked to at least one of the $i_{is}$ internal inputs of another broadcast module, and every broadcast module in the broadcast ring having an internal output of another broadcast module linked to one of its $i_{is}$ internal inputs.

24. A broadcast ring as described in claim 23 including a presentation network connected to the P broadcast modules to provide signals thereto.

25. A broadcast ring as described in claim 24 including a distribution network connected to the P broadcast modules to remove signals therefrom.

26. A broadcast hyper-ring comprising:

P broadcast modules where $P \geq 3$ and is an integer, each broadcast module having $e_{iq}$ external inputs, and $e_{or}$ external outputs, and $i_{is}$ internal inputs and $i_{ot}$ internal outputs, where $e_{iq}$, $e_{or}$, $i_{is}$, and $i_{ot} \geq 1$ and are integers, with at least one of the outputs of one of the P broadcast modules being linked to at least one of the inputs of at least 2 of the P-1 other broadcast modules, and every broadcast module in the broadcast hyper-ring having an output of another broadcast hyper-ring having an output of another broadcast module linked to one of its inputs; each broadcast module having means for connecting an input port of the $e_{iq}$ and $i_{is}$ input ports to Q of the $e_{or}$ and $i_{ot}$ output ports, where Q is an integer and $1 \geq Q \geq e_{or} + i_{ot}$, and each output port is only connected to one input port but more than one output port can be connected to an input port; and J switches, where $J \geq O$, said broadcast modules and switches are linked such that a signal that is inputted into the broadcast hyper-ring at one of the $e_{iq}$ input ports can be outputted out of the broadcast hyper-ring at L of the $e_{or}$ output ports, where L is an integer and $2 \leq L \leq e_{or}$, but each output port can only output the signal inputted into the broadcast hyper-ring from one external input port at any given time, said broadcast modules and switching stages capable of directing the signals from more than one of the $e_{iq}$ input ports to desired output ports at any given time;

and wherein a presentation network is connected to the P broadcast modules to provide signals thereto.

27. A broadcast hyper-ring described in claim 26 wherein at least one of the $i_{ot}$ internal outputs of one of the P broadcast modules is linked to at least one of the $i_{is}$ internal inputs of at least 2 of the P-1 other broadcast modules, and every broadcast module in the broadcast hyper-ring having an internal output of another broadcast module linked to one of its $i_{is}$ internal inputs;

28. A broadcast hyper-ring as described in claim 26 including a distribution network connected to the P broadcast modules to remove signals therefrom.

29. A broadcast network comprising:
a first broadcast module having a first and at least a second input port and a first and at least a second output port;
at least a second broadcast module having a first and at least a second input port and a first and at least a second output port, said second input port of said second broadcast module linked to said second output port of said first broadcast module and said second input port of said first broadcast module linked to said second output port of said second broadcast module, each broadcast module having means for connecting one of its input ports to one or more of its output ports but each broadcast module's output port being connected to only one of its input ports;
at least a first presentation switch having a first and at least a second input port and a first and at least a second output port, said first output port of said presentation switch linked to said first input port of said first broadcast module, said second output port of said presentation switch linked to said first input port of said second broadcast module; and
at least a first distribution switch having a first and at least a second input port and a first and at least a second output port, said first output port of said first broadcast module being linked to said first input port of said distribution switch and said first output port of said second broadcast module linked to said second input port of said distribution switch.

30. A broadcast network as described in claim 29 including at least a third broadcast module having a first input port and at least a second input port, and a first output port and at least a second output port; wherein the first broadcast module has at least a third input port linked to the second output port of the third broadcast module, wherein the second broadcast module has at least a third output port linked to the second input port of the third broadcast module, wherein the first presentation switch has at least a third input port and at least a third output port with the third output port linked to the first input port of the third broadcast module; and wherein the first distribution switch has at least a third input port and at least a third output port with the third input port linked to the first output port of the third broadcast module.

31. A broadcast network as described in claim 30 wherein the third broadcast module has at least a third input and at least a third output; wherein the first broadcast module has a third output port linked to the third input port of the third broadcast module; and wherein the second broadcast module has at least a third input port linked to the third output port of the third broadcast module.

32. A broadcast network as described in claim 29 wherein the second broadcast module has at least a third output port and a third and a fourth input port; wherein the first broadcast module has at least a third input port and at least a third output port; wherein the first presentation switch has a third and at least a fourth input port and a third and at least a fourth output port; wherein the first distribution switch has a third and at least a fourth output port and a third and at least a fourth input port; and including a third broadcast module having a first input port linked to the third output port of the first presentation switch, a second input port linked to the third output port of the first broadcast module and at least a third input port; and a first output port linked to the third input port of the first broadcast module, a second output port linked to the third input port of the first distribution switch, a third output port linked to the fourth input port of the second broadcast module and a fourth output port; and including a fourth broadcast module having a first, second and at least a third input port linked to the fourth output port of the presentation switch, the third output port of the second broadcast module and the fourth output port of the third broadcast module, respectively, and a first, second and at least a third output port linked to the fourth input port of the first distribution switch, the third input port of the second broadcast module and the third input port of the third broadcast module, respectively.

33. A broadcast network as described in claim 32 wherein the second broadcast module has at least a fourth output port, the third broadcast module has at least a fourth input port linked to the fourth output port of the second broadcast module; wherein the first broadcast module has at least a fourth input port and at least a fourth output port; and wherein the fourth broadcast module has a fourth input port and a fourth output port linked to the fourth output port and fourth input port, respectively, of the first broadcast module.

34. A broadcast vector comprising:
P broadcast modules, where $P \geq 2$ and is an integer, each broadcast module having $e_{iq}$ external inputs and $e_{or}$ external outputs, and $i_{is}$ internal inputs and $i_{ot}$ internal outputs, where $e_{iq}$, $e_{or}$, $i_{is}$ and $i_{ot} \geq 1$ and are integers, with at least one of the internal outputs of one of the N broadcast modules being linked to an internal input of another broadcast module and each broadcast module having means for connecting an input port of the $e_{iq}$ and $i_{is}$ input ports to Q of the $e_{or}$ and $i_{ot}$ output ports, where Q is an integer and $1 \leq Q \leq e_{or} + i_{ot}$, and each output port is only connected to one input port but more than one output port can be connected to an input port such that direct connecting paths are temporarily formed through the P broadcast modules providing for signal flow only for respective predetermined broadcasts.

35. A broadcast ring comprising:
P broadcast modules where $P \geq 2$ and is an integer, each broadcast module having $e_{iq}$ external inputs and $e_{or}$ external outputs, and $i_{is}$ internal inputs and $i_{ot}$ internal outputs, where $e_{iq}$, $e_{or}$, $i_{is}$ and $i_{ot} \geq 1$ and are integers, said external inputs and outputs providing for signals into and out of the broadcast ring, respectively but not to other broadcast modules in the broadcast rings, said internal inputs and output providing for signal flow between the broadcast modules in the broadcast ring, with at least one of the $i_{ot}$ internal outputs of the broadcast module ring linked to at least one of the $i_{is}$ internal inputs of another broadcast module, and every broadcast module in the broadcast ring having an internal output of another broadcast module linked to one of its $i_{is}$ internal inputs such that direct connecting paths are temporarily formed through the P broadcast modules providing for signal flow only for respective predetermined broadcasts.

36. A broadcast hyper-ring comprising:

P broadcast modules where $P \geq 3$ and is an integer, each broadcast module having $e_{iq}$ external inputs, and $e_{or}$ external outputs, and $i_{is}$ internal inputs and $i_{ot}$ internal outputs, where $e_{iq}$, $e_{or}$, $i_{is}$, and $i_{ot} \geq 1$ and are integers, with at least one of the outputs of one of the P broadcast modules being linked to at least one of the inputs of at least 2 of the P-1 other broadcast modules, and every broadcast module in the broadcast hyper-ring having an output of another broadcast hyper-ring having an output of another broadcast module linked to one of its inputs; each broadcast module having means for connecting an input port of the $e_{iq}$ and $i_{is}$ input ports to Q of the $e_{or}$ and $i_{ot}$ output ports, where Q is an integer and $1 \leq Q \leq e_{or} + i_{ot}$, and each output port is only connected to one input port but more than one output port can be connected to an input port; and J switches, where $J \geq 0$, said broadcast modules and switches are linked such that a signal that is inputted into the broadcast hyper-ring at one of the $e_{iq}$ input ports can be outputted out of the broadcast hyper-ring at L of the $e_{or}$ output ports, where L is an integer and $2 \leq L \leq e_{or}$, but each output port can only output the signal inputted into the broadcast hyper-ring from one external input port at any given time, said broadcast modules and switching stages capable of directing the signals from more than one of the $e_{iq}$ input ports to desired output ports at any given time such that direct connecting paths are temporarily formed through the P broadcast modules providing for signal flow only for respective predetermined broadcasts.

37. A broadcast vector comprising:

P broadcast modules, where $P \geq 2$ and is an integer, each broadcast module having $e_{iq}$ external inputs and $e_{or}$ external outputs, and $i_{is}$ internal inputs and $i_{ot}$ internal outputs, where $e_{iq}$, $e_{or}$, $i_{is}$ and $i_{ot} \geq 1$ and are integers, with at least one of the internal outputs of one of the N broadcast modules being linked to an internal input of another broadcast module and each broadcast module having means for connecting an input port of the $e_{iq}$ and $i_{is}$ input ports to Q of the $e_{or}$ and $i_{ot}$ output ports, where Q is an integer and $1 \leq Q \leq e_{or} + i_{ot}$, and each output port is only connected to one input port but more than one output port can be connected to an input port such that open connecting paths are formed between the P broadcast modules.

38. A broadcast ring comprising:

P broadcast modules where $P \geq 2$ and is an integer, each broadcast module having $e_{iq}$ external input, and $e_{or}$ external outputs, and $i_{is}$ internal inputs and $i_{ot}$ internal outputs where $e_{iq}$, $e_{or}$, $i_{is}$ and $i_{ot} \geq 1$ and are integers, said external inputs and outputs providing for signals into and out of the broadcast ring, respectively but not to other broadcast modules in the broadcast rings, said internal inputs and output providing for signal flow between the broadcast modules in the broadcast ring, with at least one of the $i_{ot}$ internal outputs of the broadcast module ring linked to at least one of the $i_{is}$ internal inputs of another broadcast module, and every broadcast module in the broadcast ring having an internal output of another broadcast module linked to one of its $i_{is}$ internal inputs such that open connecting paths are formed between the P broadcast modules.

39. A broadcast hyper-ring comprising:

P broadcast modules where $P \geq 3$ and is an integer, each broadcast module having $e_{iq}$ external inputs, and $e_{or}$ external outputs, and $i_{is}$ internal inputs and $i_{ot}$ internal outputs, where $e_{iq}$, $e_{or}$, $i_{is}$, and $i_{ot} \geq 1$ and are integers, with at least one of the outputs of one of the P broadcast modules being linked to at least one of the inputs of at least 2 of the P-1 other broadcast modules, and every broadcast module in the broadcast hyper-ring having an output of another broadcast hyper-ring having an output of another broadcast module linked to one of its inputs; each broadcast module having means for connecting an input port of the $e_{iq}$ and $i_{is}$ input ports to Q of the $e_{or}$ and $i_{ot}$ output ports, where Q is an integer and $1 \leq Q \leq e_{or} + i_{ot}$, and each output port is only connected to one input port but more than one output port can be connected to an input port; and J switches, where $J \geq 0$, said broadcast modules and switches are linked such that a signal that is inputted into the broadcast hyper-ring at one of the $e_{iq}$ input ports can be outputted out of the broadcast hyper-ring at L of the $e_{or}$ output ports, where L is an integer and $2 \leq L \leq e_{or}$, but each output port can only output the signal inputted into the broadcast hyper-ring from one external input port at any given time, said broadcast modules and switching stages capable of directing the signals from more than one of the $e_{iq}$ input ports to desired output ports at any given time such that open connecting paths are formed between the P broadcast modules.

* * * * *

UNITED STATES PATENT AND TRADEMARK OFFICE
CERTIFICATE OF CORRECTION

Page 1 of 5

PATENT NO. : 4,975,909
DATED : December 4, 1990
INVENTOR(S) : Gerald M. Masson, et al.

It is certified that error appears in the above—identified patent and that said Letters Patent is hereby corrected as shown below:

In column 6, line 46, the mathematical expression "$|E_i|=E_0|=|I_i|=|I_{01}|=1$" should be --$|E_i|=|E_0|=|I_i|=|I_0|=1$--.

In column 9, lines 61 and 63, the term "$i_{jl}$" should be --"$i_{il}$"--.

In column 10, lines 56 and 57, the mathematical expression "$|E_i|=|E_0|=|I_i|=|I\text{-}_0|=1$ should be --$|E_i|=|E_0|=|I_i|=|I_0|=1$--.

In column 11, lines 11 and 13, the term "$e_{jl}$" should be --$e_{il}$--.

In column 11, line 17 (both occurrences), line 19, line 22 and line 23, the term "$i_{jl}$" should be --$i_{il}$--.

In column 11, line 20, the term "$oli_{01}$" should be --$i_{01}$--.

In column 11, line 31, there should be a period "." after "544" (first occurrence).

In column 13, line 50, the parenthetical mathematical expression "(c.h.j)" should be --(c,h,j)--.

In column 13, line 55, the period "." after "module" (second occurrence) should not be present.

In column 17, line 1, the term "P14" should be --PI4--.

In column 18, line 15, the letter "$m$" should appear after the term --are--.

UNITED STATES PATENT AND TRADEMARK OFFICE
CERTIFICATE OF CORRECTION

PATENT NO. : 4,975,909

DATED : December 4, 1990

INVENTOR(S) : Gerald M. Masson, et al.

It is certified that error appears in the above—identified patent and that said Letters Patent is hereby corrected as shown below:

In column 18, line 21, the mathematical expression "BM1=(P01,P02,B2)" should be --BM1=(P01,P01,B2)--.

In column 18, line 32, the term "DIi" should appear after the term "then".

In column 19, line 45, in the mathematical equation beginning with "$\Lambda=$", the intersection symbol inside the braces on the right side of the equation should be a union symbol.

In column 20, line 11, the mathematical expression "$\Gamma = \Gamma DI_q$" should be --$\Gamma=\Gamma-DI_q$--.

In column 20, line 41, the mathematical expression written in part as "$DI_q \epsilon \theta_S = DI R_S-$" should be --$DI_q \epsilon \theta_S = DI R_S$--

In column 20, line 42, an intersection symbol should be placed before "DIAV".

In column 21, line 33, the mathematical expression "si ($s_1, s_2,..., s_k$)" should be --$s_i \epsilon (s_1, s_2,..., s_k)$--.

In column 22, line 15, the mathematical expression "$\Lambda$=BM4=(P01, P01, B2, P04, P04, DI4, B2, B3)" should be --$\Lambda$=BM1 U BM4=(P01, P01, B2, P04, P04, DI4, B2, B3)--.

In column 22, line 45, after the mathematical expression "$DI4 \epsilon \theta_p$=(DI2, DI3, DI4)" there should be a period --.--.

UNITED STATES PATENT AND TRADEMARK OFFICE
CERTIFICATE OF CORRECTION

PATENT NO. : 4,975,909

DATED : December 4, 1990

INVENTOR(S) : Gerald M. Masson, et al.

It is certified that error appears in the above—identified patent and that said Letters Patent is hereby corrected as shown below:

In Claim 1, column 24, line 4, the mathematical expression "$2 \geq L \geq M$" should be --$2 \leq L \leq M$--.

In Claim 5, column 24, line 24, the phrase "$i_{is}$ internal outputs" should be --$i_{is}$ internal inputs--.

In Claim 5, column 24, line 24, the phrase "$i_{ot}$ internal inputs" should be --$i_{ot}$ internal outputs--.

In Claim 5, column 24, line 26, the letter "N" should be --P--.

In Claim 11, column 24, line 52, the numeral "10" should be --16--.

In Claim 12, column 24, line 63, a comma "," should be present after the term --respectively--.

In Claim 17, column 25, line 34, the term "modules" should be --module--.

In Claim 17, column 25, line 38, the mathematical expression "$1 \geq Q \geq e_{or} + i_{ot}$" should be --$1 \leq Q \leq e_{or} + i_{ot}$--.

In Claim 17, column 25, line 47, the mathematical expression "$2 \geq L \geq e_{or}$" should be --$2 \leq L \leq e_{or}$--.

In Claim 21, column 26, line 12, the mathematical expression "$1 \geq Q \geq e_{or} + i_{ot}$" should be --$1 \leq Q \leq e_{or} + i_{ot}$--.

In Claim 23, column 26, line 27, a comma "," should be present after the term --respectively--.

UNITED STATES PATENT AND TRADEMARK OFFICE
CERTIFICATE OF CORRECTION

PATENT NO. : 4,975,909

DATED : December 4, 1990

INVENTOR(S) : Gerald M. Masson, et al.

It is certified that error appears in the above—identified patent and that said Letters Patent is hereby corrected as shown below:

In Claim 26, column 26, line 58, the mathematical expression "$1 \geq Q \geq e_{or}+i_{ot}$" should be --$1 \leq Q \leq e_{or}+i_{ot}$--.

In Claim 27, column 27, line 14, the semicolon ";" should be a period --.--.

In Claim 34, column 28, line 49, the letter "N" should be --P--.

In Claim 35, column 28, line 68, a comma "," should be present after the term --respectively--.

In Claim 35, column 29, line 2, the term "output" should be --outputs--.

In Claim 37, column 29, line 53, the letter "N" should be --P--.

UNITED STATES PATENT AND TRADEMARK OFFICE
CERTIFICATE OF CORRECTION

PATENT NO. : 4,975,909

DATED : December 4, 1990

INVENTOR(S) : Gerald M. Masson, et al

It is certified that error appears in the above-identified patent and that said Letters Patent is hereby corrected as shown below:

In Claim 38, column 30, line 13, a comma "," should be present after the term --respectively--.

In Claim 38, column 30, line 4, the term "rings" should be --ring--.

In Claim 39, column 30, lines 35 and 36, the phrase "hyper-ring having an output of another broadcast" should be deleted.

Signed and Sealed this

Thirteenth Day of October, 1992

*Attest:*

DOUGLAS B. COMER

*Attesting Officer*     *Acting Commissioner of Patents and Trademarks*